US012559187B2

(12) United States Patent
Fu et al.

(10) Patent No.: US 12,559,187 B2
(45) Date of Patent: Feb. 24, 2026

(54) WALKING VEHICLE

(71) Applicants: Hyundai Motor Company, Seoul (KR); Kia Corporation, Seoul (KR)

(72) Inventors: Ernestine Fu, Superior Township, MI (US); Grey Parker, West Bloomfield, MI (US); John Suh, Palo Alto, CA (US); Daniel Chan, Superior Township, MI (US); David Byron, Southfield, MI (US); Prasanna Natarajan, Aldie, VA (US)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 800 days.

(21) Appl. No.: 17/567,000

(22) Filed: Dec. 31, 2021

(65) Prior Publication Data

US 2023/0211841 A1     Jul. 6, 2023

(51) Int. Cl.
| | |
|---|---|
| *B62D 57/028* | (2006.01) |
| *B60B 19/00* | (2006.01) |
| *B60K 7/00* | (2006.01) |
| *B62D 57/024* | (2006.01) |

(52) U.S. Cl.
CPC .......... *B62D 57/028* (2013.01); *B60B 19/003* (2013.01); *B60K 7/0007* (2013.01); *B60K 2007/0092* (2013.01); *B62D 57/024* (2013.01)

(58) Field of Classification Search
CPC ................................................... B62D 57/028
See application file for complete search history.

(56) References Cited

U.S. PATENT DOCUMENTS

| | | | |
|---|---|---|---|
| 2020/0216127 A1* | 7/2020 | Suh | B25J 18/02 |
| 2021/0276642 A1* | 9/2021 | Gillett | G05D 1/0022 |
| 2021/0283783 A1* | 9/2021 | Gillett | G05D 1/0278 |
| 2022/0242506 A1* | 8/2022 | Bae | B62D 57/028 |
| 2023/0211842 A1* | 7/2023 | Fu | G06V 20/56 |
| 2024/0302835 A1* | 9/2024 | Fu | B62D 57/028 |
| 2024/0351597 A1* | 10/2024 | Fu | B60W 50/08 |

FOREIGN PATENT DOCUMENTS

| | | | | |
|---|---|---|---|---|
| CN | 110696940 A | * | 1/2020 | ........... B62D 57/028 |
| CN | 110936346 A | * | 3/2020 | |
| CN | 111846002 A | * | 10/2020 | |
| CN | 112373595 A | * | 2/2021 | ............. B25J 11/00 |
| CN | 113815743 A | * | 12/2021 | |
| CN | 116985931 A | * | 11/2023 | ........... B60B 19/125 |

* cited by examiner

*Primary Examiner* — Kevin Hurley
(74) *Attorney, Agent, or Firm* — Fox Rothschild LLP

(57) ABSTRACT

A walking vehicle including a chassis and a plurality of wheel-leg components is described. The plurality of wheel-leg components are collectively operable to provide wheeled locomotion and walking locomotion.

12 Claims, 30 Drawing Sheets

300

310

320

310

310

RANGE OF MOTION
This system can move laterally, but even when looking at only single axis 2D movement, the potential for quadra-pedal ambulation is still great

700

STRENGTH OF MOTION
Looking at insect legs such as the common grasshopper, this design mimics the relationship and proportion the Tibia and Femur have as they connect through the Coxa to the body.

800

VEHICLE FORMAT AND ARTICULATION
ROBOT ARM DEGREES OF FREEDOM
1 DOF - WHEEL ROTATION

1st DEGREE OF FREEDOM: WHEEL
ROTATION

800

VEHICLE FORMAT AND ARTICULATION
ROBOT ARM DEGREES OF FREEDOM
2 DOF - STEERING

2<sup>nd</sup> DEGREE OF FREEDOM: STEERING

FIG. 7B

Single direction movement can translate the vehicle body.

Forward translation is only possible through vertical heaving. Forward and rearward wheels rolls as pairs to achieve position before next "step".

800

VEHICLE FORMAT AND ARTICULATION
ROBOT ARM DEGREES OF FREEDOM
3 DOF - UNILATERAL MOVEMENT

VEHICLE FORMAT AND ARTICULATION
ROBOT ARM DEGREES OF FREEDOM
4 DOF - MINIMIZED WALKING

Weight transfers from
4 to 3 contact patches
and the knee joint allows
the wheel to swing
forward without hitting
ground plane.

Forward translation of
the vehicle body can occur.

Swing Phase

Heel-Strike

Toe-Off

800

VEHICLE FORMAT AND ARTICULATION
ROBOT ARM DEGREES OF FREEDOM
4 DOF - MINIMIZED WALKING

Weight transfers from
4 to 3 contact patches
and the knee joint allows
the wheel to swing
forward without hitting
ground plane.

Forward translation of
the vehicle body can occur.

Heel-Strike

Swing Phase

Toe-Off

800

VEHICLE FORMAT AND ARTICULATION
ROBOT ARM DEGREES OF FREEDOM
5 DOF - STABILITY + CENTROID CONTROL
• REPTILIAN vs MAMMALIAN

MAMMALIAN

2nd

1st

Forward articulation requires a height gain first. This has the added benefits of ground clearance and allows mobility without violating the vehicle lane. Vertical real estate is likely much easier to come by than lateral. Lateral stability can still be achieved and increases as the vehicle lowers, requiring smaller steps.

REPTILIAN

2nd

1st

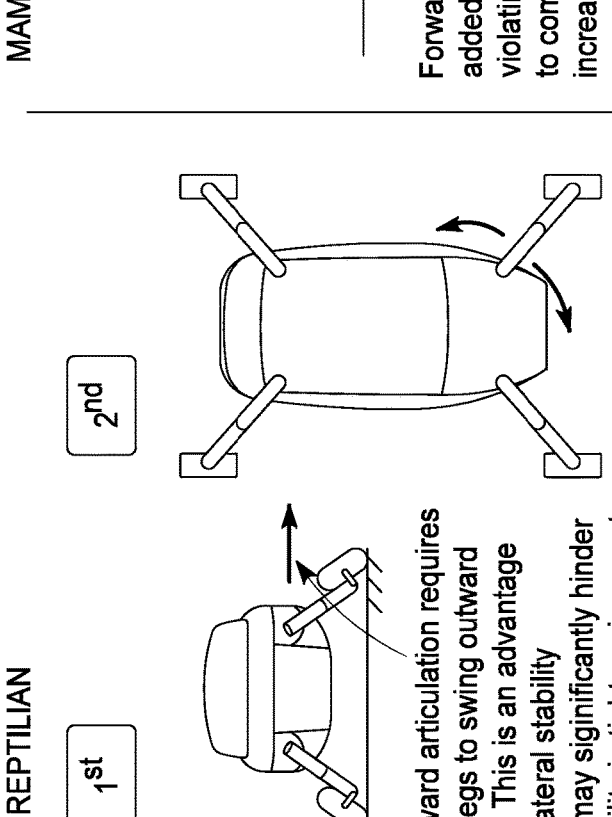

Forward articulation requires the legs to swing outward first. This is an advantage for lateral stability but may significantly hinder mobility in tight environments (in alleyways, through narrow trails, etc)

FIG. 7F

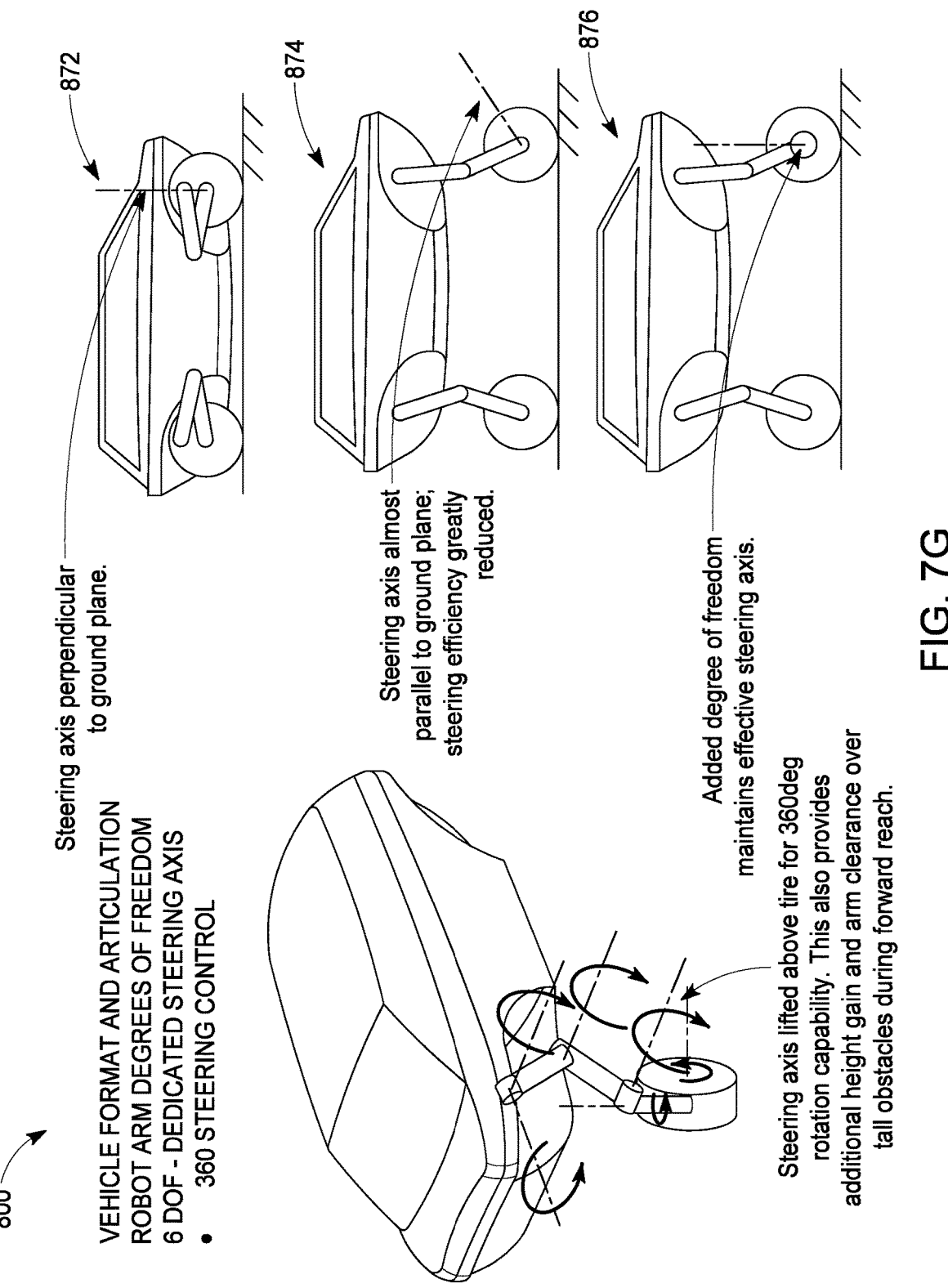

872

Steering axis perpendicular to ground plane.

874

Steering axis almost parallel to ground plane; steering efficiency greatly reduced.

876

Added degree of freedom maintains effective steering axis.

800

VEHICLE FORMAT AND ARTICULATION
ROBOT ARM DEGREES OF FREEDOM
6 DOF - DEDICATED STEERING AXIS
• 360 STEERING CONTROL

Steering axis lifted above tire for 360deg rotation capability. This also provides additional height gain and arm clearance over tall obstacles during forward reach.

FIG. 7G

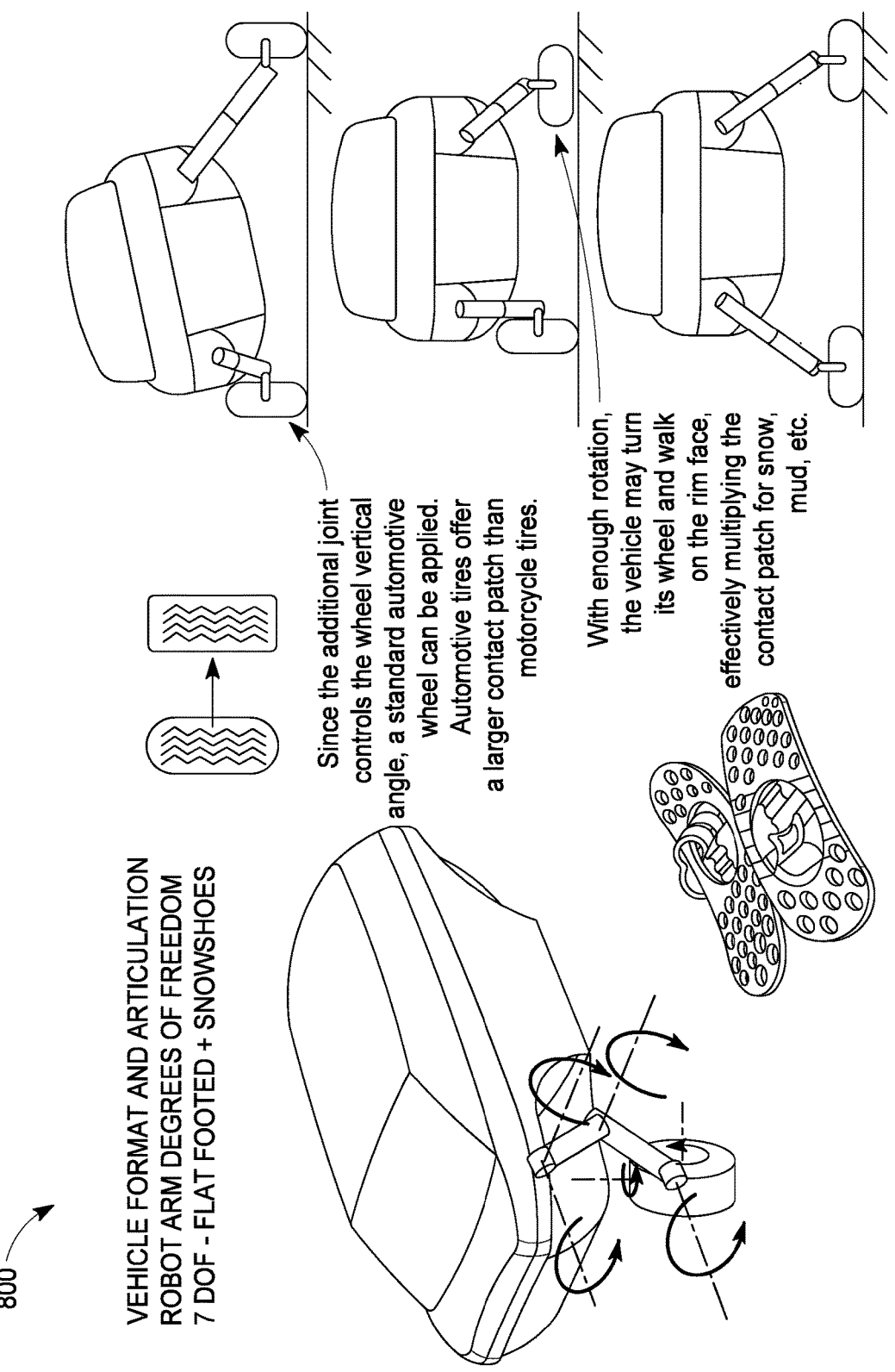

Since the additional joint controls the wheel vertical angle, a standard automotive wheel can be applied. Automotive tires offer a larger contact patch than motorcycle tires.

With enough rotation, the vehicle may turn its wheel and walk on the rim face, effectively multiplying the contact patch for snow, mud, etc.

VEHICLE FORMAT AND ARTICULATION
ROBOT ARM DEGREES OF FREEDOM
7 DOF - FLAT FOOTED + SNOWSHOES

WALKING VEHICLE

BACKGROUND

In general, cars and other ground-based vehicles are relatively limited in their modes of movement. For example, conventional ground-based vehicles, such as automobiles, are generally limited to travel on roads or, on occasion, some types of off road travel. Moreover, conventional ground-based vehicles are unable or very limited in their ability to traverse difficult terrain.

It thus would be desirable to have new vehicle and systems, include those that could enable or facilitate mobility over difficult terrain.

SUMMARY

We now provide vehicles that are capable of locomotion using both, either or alternatively 1) a walking motion and/or 2) rolling traction, i.e. 1) a roll or driving state and/or 2) a step or walk state.

In certain preferred aspects of the present vehicles, a combination of wheels and legs are used to enable at least six degrees of freedom and omnidirectional movement, including mammalian and reptilian walking gaits. In some embodiments, the wheel-leg locomotion is provided using multiple wheel-leg units (e.g., four wheel-leg units) that are collectively operated to provide locomotion to the desired locomotion.

In certain aspects, vehicles are provided that comprise: a plurality of wheel-leg components, wherein the plurality of wheel-leg components provide wheeled locomotion and walking locomotion, and wherein each wheel-leg component has multiple degrees of freedom and the total degrees of freedom of the wheel-leg components are at least 8 and preferably may be at least 9, 10, 11, 12, 13, 14, 15, 16, 17, 18, 19, 20, 21, 22, 23, 24, 25, 26, 27 or 28. Suitably the wheel-leg components are coupled to a chassis of the vehicle. Preferably, the degrees of freedom of single wheel-leg component is at least 2, 3, 4, 5, 6 or 7. The total degrees of freedom of a vehicle is calculated by the addition of the degrees of freedom of each wheel-leg component. Thus, if the vehicle has a total of 4 wheel-leg components, and each wheel-leg component has 6 degrees of freedom, then the total degrees of freedom of the vehicle as referred to herein is 24. If the vehicle has a total of 4 wheel-leg components, and each wheel-leg component has 7 degrees of freedom, then the total degrees of freedom of the vehicle as referred to herein is 28.

In one embodiment, degrees of freedom of a wheel-leg component can be as specified in U.S. 2020/0216127 to Suh et al., where preferred wheel-leg component include those that each has at least four degrees of freedom, and more preferably six degrees of freedom. In such preferred system, a leg unit of the wheel-leg component suitably comprises a hip housing; at least two leg links; and a wheel rotation and steering housing. In certain preferred systems, the degrees of freedom of the leg unit include hip abduction, hip extension, knee extension and ankle extension, and the degrees of freedom of a wheel unit may suitably include wheel steering and wheel rotation to thereby provide a total of six degrees of freedom of the wheel-leg component. Such a preferred wheel-leg component as disclosed in U.S. Published Patent Application 2020/0216127 having six degrees of freedom (with 4 degrees of freedom from the hip and leg unit and an additional 2 degrees of freedom from the wheel unit) may be referred herein to Type 1 Degrees of Freedom.

In another embodiment, degrees of freedom of a wheel-leg component can be as specified in FIG. 8 herein (which includes FIGS. 8A through 8H), i.e. where the depicted wheel-leg component may be described as having the following 7 degrees of freedom: 1) wheel rotation (FIG. 8A); 2) steering (FIG. 8B—directional control of the wheel); 3) unilateral movement (FIG. 8C—e.g. vertical heaving with rear wheels moving to forward position); 4) minimized walking (FIG. 8D); 5) stability and centroid control (FIGS. 8E and 8F); 6) steering axis (e.g. articulation of knee joint, see FIG. 8G); and 7) flat footing walking (FIG. 8H). Such a preferred wheel-leg component as disclosed in FIG. 8 as having 7 degrees of freedom is referred to herein as Type 2 Degrees of Freedom.

It also will be understand that other suitable wheel leg components may have differing degrees of freedom based on the component's configuration. In general, a preferred wheel-leg component will have multiple degrees of freedom such as at least 2, 3, 4, 5, or 6.

In certain preferred aspects, one or more of the wheel-leg components can be operated and articulated independently of one or more other of the wheel-leg components, or each of the wheel-leg components can be operated and articulated independently with respect to each of the other wheel-leg components.

In particularly preferred aspects, each of the wheel-leg components can be operated and articulated independently and in coordination with one or more of the other wheel-leg components.

In certain preferred vehicles, a wheel-leg component is in a retracted position (reduced height) for a wheeled or roll mode, and the wheel-leg component will be in an extended (greater height) position of a walk mode of the vehicle.

In certain preferred aspects, one or more wheel-leg components utilize a mammalian walking gait during walking locomotion of the vehicle In additional certain preferred aspects, one or more wheel-leg components utilize a reptilian walking gait during walking locomotion of the vehicle.

In other aspects, methods are provided, including methods for locomotion and method for traversal of ground surfaces that may be substantially even (e.g. less than 5, 4, 3, 2 or 1 or 0.5 degrees incline and/or substantially unobstructed whereby the surface can be traversed by a standard passenger automobile) as well as traversal of ground surfaces that are uneven (e.g. incline of at least 0.5, 1, 2, 3, 4, 5, 8, or 10 degrees for at least 0.25, 0.5, 1, 2, 3, 4, 5, 6, 12, 24, 26, 48, 200, 200, 300, 400, 500 or 1000 feet and/or substantially unobstructed whereby the surface can not be reasonably traversed by a standard passenger automobile).

In one aspect, methods are provided that comprise (a) providing a vehicle as described herein wherein the vehicle comprises passenger space for one or more passengers; and (b) moving the vehicle across an uneven ground surface while maintaining the passenger space substantially even. The vehicle suitably may move across or traverse a ground surface that has an incline of at least 1, 2, 3, or 5 degrees for at last 1, 10 or 100 feet, or is obstructed (e.g. by natural terrain or wreckage) whereby the surface can not be reasonably traversed by a standard passenger automobile). In such methods, suitably one or more of the vehicle's wheel-leg components are operated in a walk mode, including where each of the vehicle's wheel-leg components are operated in a walk mode. In such methods, a passenger space will be considered as be maintained substantially even while traversing the uneven ground surface if the passenger space is maintained in a desired position (e.g. in a plane parallel to the horizontal and perpendicular to a vertical plane) without more than a 8, 7, 6, 5, 4, 3, 2 or 1 degree deviation from such desired position (e.g. in a plane parallel to the horizontal and perpendicular to a vertical plane) while traversing 10, 20, 30, 40, 5, 7, 80, 100, 200, 300, 400, 500, 600, 700, 800, 900 or 1000 feet or more.

In additional aspects, methods are provided that comprise: a) providing a vehicle that comprises a plurality of wheel-leg components suitably coupled to the chassis, wherein the plurality of wheel-leg components can provide wither or both wheeled locomotion and walking locomotion; b) moving two or more wheel-leg components to advance the vehicle on a ground surface, wherein at least one wheel-leg component is moved in a walk mode and at least one wheel-leg component is moved in a roll mode.

In certain embodiments of such methods, at least two wheel-leg components of a vehicle are moved in a walk mode and at least two wheel-leg components are moved in a roll mode during movement of the vehicle. In certain embodiments of the methods, the vehicle has a total of four wheel-leg components suitably wherein each wheel-leg component has multiple degrees of freedom. In certain embodiments, the total degrees of freedom of all the wheel-leg components of a vehicle (i.e. the sum of each wheel-leg component of the vehicle) is at least 12, 14, 16, 18, 20, or 24, such as 24 or 28.

In additional aspects, methods are provided that comprise: a) providing a vehicle that comprises a plurality of wheel-leg components suitably coupled to the chassis, wherein the plurality of wheel-leg components can provide wheeled locomotion and walking locomotion; b) moving one or more wheel-leg components to advance the vehicle on a ground surface, wherein at least one wheel-leg component is moved in a walk mode and provides a rolling motion with or upon each contact of the wheel-leg component on a ground surface, i.e. which each step the wheel unit rolls to augment the walk locomotion. In such methods, the rolling motion at each step of the wheel-leg component may be at a comparatively slow rate, for example the wheel of the wheel-leg component may be rotating at a rate that would provide a speed of less than 15, 14, 13, 12, 11, 10, 9, 8, 7, 6, 5, 4, 3, 2, 1 or 0.5 miles per hour as calculated if the vehicle was operating in a roll mode (all wheel-leg components operating on rolling wheels) on a flat ground surface. Similarly, in such methods, the rolling motion at each step of the wheel-leg component may be at a rate of less than 500, 400, 300, 200, 100, 90, 80, 70, 60, 5-0, 40, 30 20 or 10 revolutions of the wheel per minute.

In certain embodiments of such methods, at least two wheel-leg components of a vehicle are moved in a walk mode with a rolling action upon contact of the wheel-leg component on a ground surface (e.g. during each step of the wheel-leg component). In certain embodiments of such methods, at least four wheel-leg components of a vehicle are moved in a walk mode with a rolling action upon contact of each of the four wheel-leg components on a ground surface (e.g. during each step of the wheel-leg component). Such roll motion can augment a walk mode and thereby facilitate desired locomotion of a vehicle. In certain embodiments of the methods, the vehicle has a total of four wheel-leg components suitably wherein each wheel-leg component has multiple degrees of freedom. In certain embodiments, the total degrees of freedom of all the wheel-leg components of a vehicle (i.e. the sum of each wheel-leg component of the vehicle) is at least 6, 8, 10, 12, 14, 16, 18, 20, or 24, such as 24 or 28.

In certain aspects, the present vehicles are fully or partially autonomous. In certain other aspects, the present vehicles are not autonomous. Full or partial autonomous vehicles may be preferred for use in certain environments, for example while using walking motion-gait of the present vehicles This movement capability of rolling motion and walking motion (e.g. in off-road terrains) as well as in roll or driving state operation such as on roads. For example, in situations where the vehicle is used to scale rocks or traverse other irregular surfaces that may be facilitated with a driver exiting the vehicle and proceeding on foot. Simultaneously, it is also a practical vehicle that can traverse both paved and unpaved roads using driven wheel locomotion. This dual-domain is enabled by using wheel-leg locomotion.

In certain aspects, a vehicle can utilize different walking gaits, such as mammalian and reptilian gaits, for walking movement. The walking gaits available to the vehicle can be based on animal allometry, i.e., the study of animal proportions and scaling. The walking gaits of various animals can be used as templates for the walking motion of the wheel-leg locomotion. For example, walking locomotion of the wheel-leg units can mimic walking gaits of different species and their respective characteristics, allowing for design of wheel-leg unit degrees of freedom mirror that of muscles in an animal thigh, including quadriceps and thighs. For example, walking gait and movement characteristics of top climbing species and efficient walking species, such as strong traction on steep mountain slopes, can be investigated and implemented. This information can be used to engineer wheel-leg unit leg links and vehicle body length design, including reptilian and mammalian walking gaits.

In certain aspects, the present vehicles may utilize software-based flexible and dynamic controls to control the wheel-leg locomotion. For example, the vehicle can utilize the Robotic Operating System (ROS) to provide such control.

As discussed, in certain aspects, the present vehicles may be autonomous or semi-autonomous. An autonomous vehicle is a vehicle having an autonomous driving function that autonomously controls a vehicle's behavior by identifying and determining surrounding conditions. To achieve a high level of autonomous driving function, an autonomous vehicle needs to safely control its behavior by realizing surrounding environments under various conditions in research and development stages, and by detecting and determining the surrounding environments well.

In a fully autonomous vehicle, the vehicle may perform all driving tasks under all conditions and little or no driving assistance is required a human driver. In semi-autonomous vehicle, for example, the automated driving system may perform some or all parts of the driving task in some conditions, but a human driver regains control under some conditions, or in other semi-autonomous systems, the vehicle's automated system may oversee steering and accelerating and braking in some conditions, although the human driver is required to continue paying attention to the driving environment throughout the journey, while also performing the remainder of the necessary tasks.

Other aspects of the invention are disclosed infra.

BRIEF DESCRIPTION OF THE DRAWINGS

The accompanying drawings, which are incorporated in and form a part of the Description of Embodiments, illustrate various embodiments of the subject matter and, together with the Description of Embodiments, serve to explain principles of the subject matter discussed below.

Unless specifically noted, the drawings referred to in this Brief Description of Drawings should be understood as not being drawn to scale. Herein, like items are labeled with like item numbers.

FIGS. 8A through 8H illustrate examples of vehicle articulation in different degrees-of-freedom, according to embodiments.

FIGS. 11A through 11D illustrate example views of a vehicle operating in a hybrid walking gait, according to embodiments.

DETAILED DESCRIPTION

Figure 1:
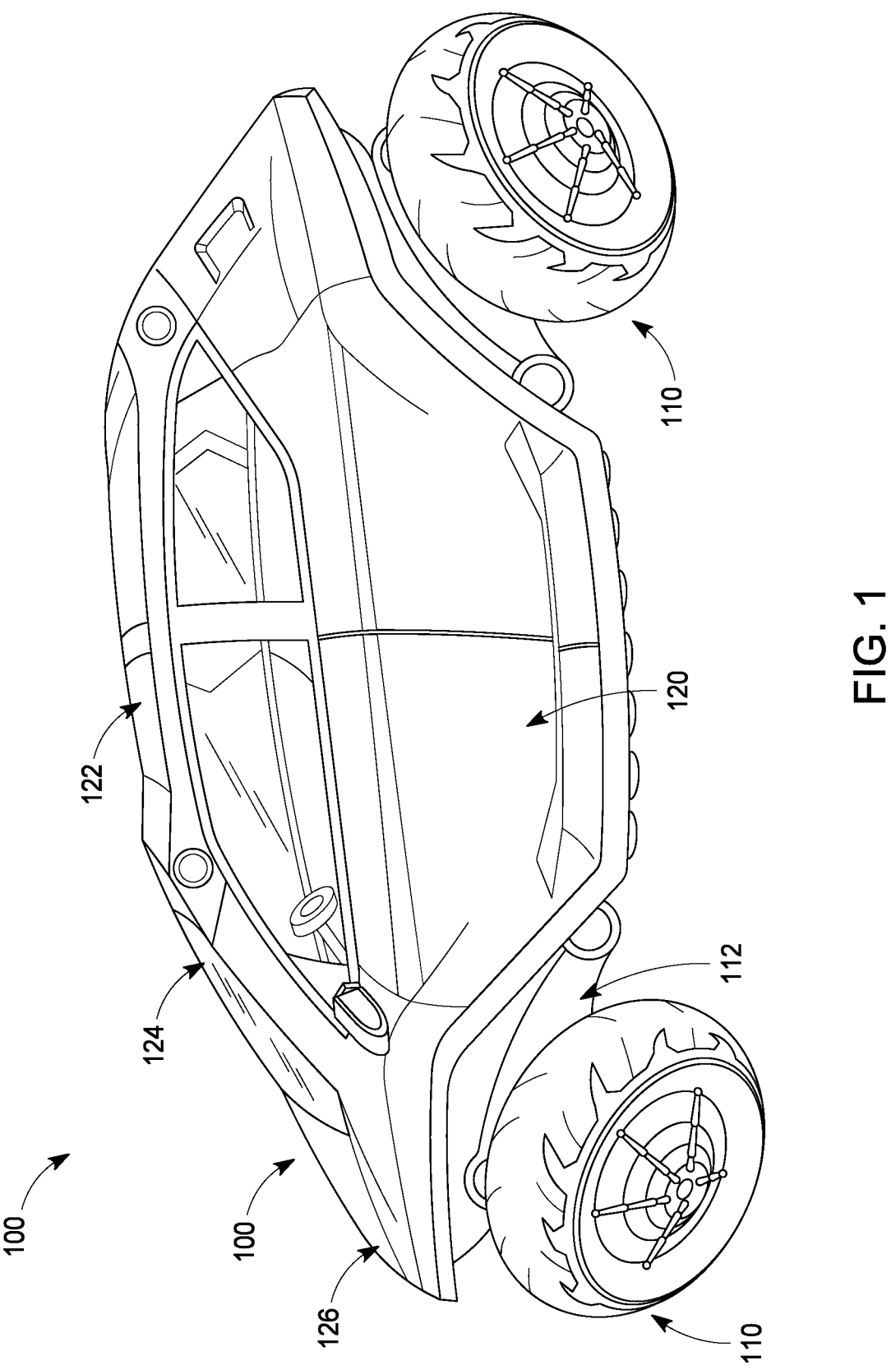
FIG. 1 is a diagram illustrating an example vehicle capable of locomotion using both walking motion and rolling motion, according to embodiments.

In certain preferred systems, a vehicle includes a chassis and a plurality of wheel-leg components. The plurality of wheel-leg components are collectively operable to provide wheeled locomotion and walking locomotion. In some embodiments, the wheel-leg components have multiple degrees of freedom. In some embodiments, the wheel-leg components provide the wheeled locomotion in a retracted position and provide the walking locomotion in an extended position. In one embodiment, the plurality of wheel-leg components utilize a mammalian walking gait during the walking locomotion. In one embodiment, the plurality of wheel-leg components utilize a reptilian walking gait during the walking locomotion.

In certain preferred aspects, preferred wheel-leg components and vehicles are disclosed in U.S. Patent Application Publication 2020/0216127 to Suh et al., incorporated herein by reference.

Wheels provide efficient and versatile mobility in wide range of terrain. However, there are times when wheel driven locomotion is difficult or impossible. Moreover, there are times when walking locomotion would be useful, such as when the vehicle gets stuck in terrain that makes vehicles susceptible to roll over. In such environments, walking locomotion allows for greater mobility for the vehicle.

In some embodiments, a present vehicle can operate in different walking locomotion modes, such as a mammalian walking gait or a reptilian walking gate. As with the mammalian and reptilian walking gaits found naturally in mammals and reptiles, different walking gaits are amenable to different terrains and environments. For instance, a reptilian gait has a wide stance, increasing balance, while a mammalian gait generally improves traversal in the forward direction by providing increased speed. Other walking gaits, or combinations of features from different walking gaits found in nature, can be combined to provide desired mobility and locomotion. For example, the vehicle may require the ability to fold the legs so that they would be compact when retracted.

In certain aspects, the present vehicles may be adapted for specific cases, such as and without limitation: urban mobility, senior mobility, the daily drive, defense and search and rescue, and patrol, survey, or expedition. The described vehicle may be of a size to hold and transport passengers, or may be a smaller unmanned vehicle meant for exploration or cargo transport. Depending on the use case, there are mobility capabilities that cover most types of terrain traversal while in walking locomotion mode. The mobility capabilities include, without limitation, 1) step-up, 2) ramp or incline climb, 3) obstacle step-over, and 4) gap crossing.

In certain aspects, the present vehicles utilize wheel-leg components that have a number of degrees of freedom, e.g., six degrees of freedom. The wheel-leg components are operable using wheeled locomotion in a retracted state and operable in walking locomotion when in an extended state. While the vehicle is described herein as having four wheel-leg components, it should be appreciated that there can be different amounts of wheel-leg components depending on the use case.

FIG. 1 is a diagram illustrating an example vehicle 100 capable of locomotion using both walking motion and rolling motion, according to embodiments. Vehicle 100 includes four wheel-leg components 110 that include leg units 112 and depicted wheels, where wheel-leg components 110 include at least two degrees of freedom and preferably wheel-leg components 110 each have at least 3, 4, 5, 6, 7 or more degrees of freedom. As illustrated, vehicle 100 includes a passenger compartment capable of holding people. It should be appreciated that vehicle 100, in some embodiments, may not include a passenger compartment. For instance, vehicle 100 can be of a size that is too small for holding passengers, and/or may be configured for cargo transport or terrain exploration under unmanned control. In FIG. 1 vehicle 110 is shown with doors 120, roof unit 122 windshield 124 and hood/front 126.

In one embodiment, wheel-leg components 110 include six degrees of freedom (e.g., as illustrated below in FIGS. 8A through 8G). It should be appreciated that while wheel-leg components 110 are controlled collectively to provide rolling and walking locomotion, each wheel-leg component 110 is capable of different movement or positioning during operation. For example, while using wheeled locomotion on an upward slope, in order to maintain the body of vehicle 100 level with flat ground, the front wheel-leg components 110 may be retracted and the rear wheel-leg components 110 be extended. In another example, while using walking locomotion to traverse rough terrain, each wheel-leg component 110, or opposite pairs of wheel-leg components 110 (e.g., front left and rear right), can move differently than the other wheel-leg components 110.

Figure 2:
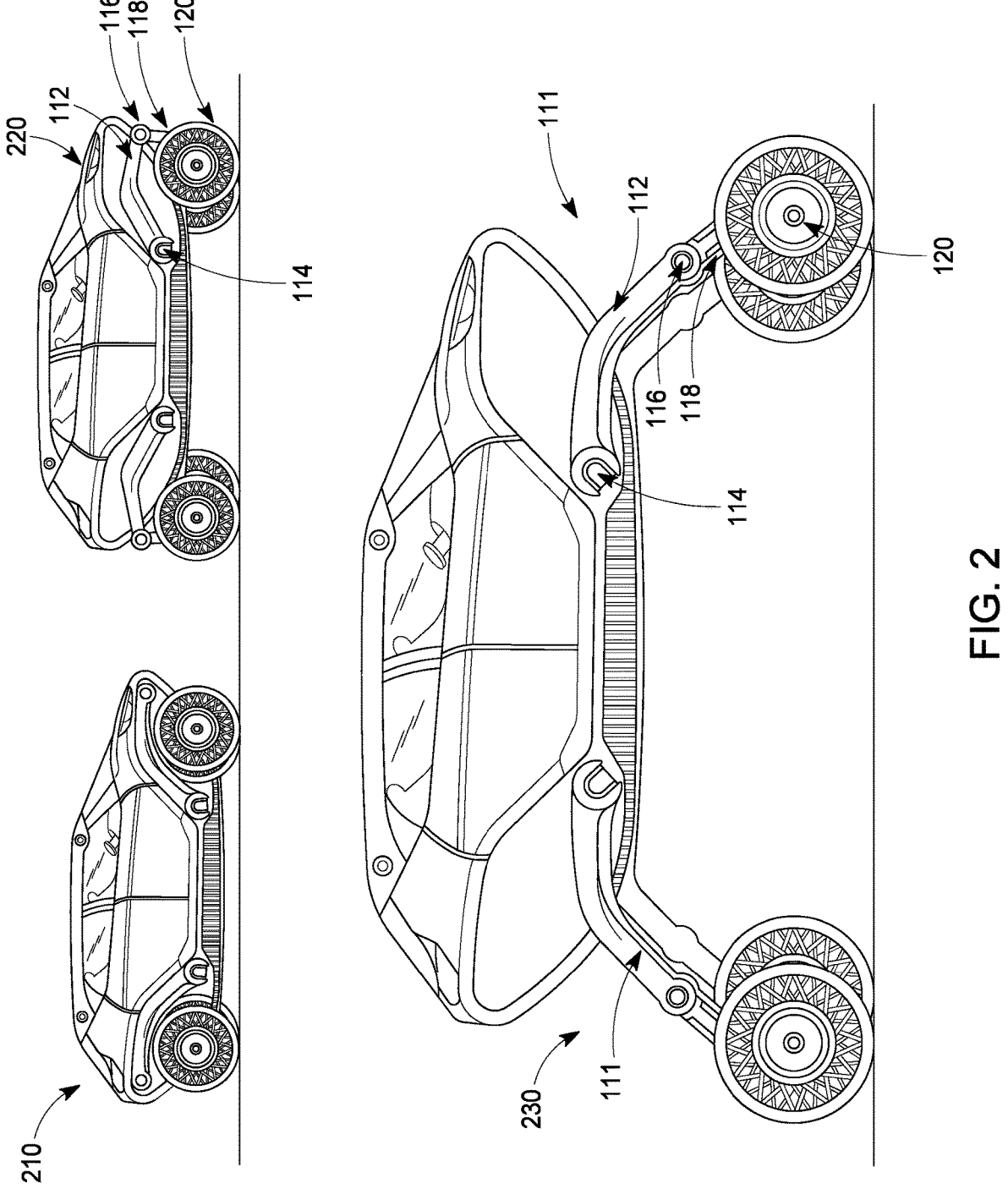
FIG. 2 is a diagram illustrating an example transformation from a retracted rolling motion mode to an extended rolling motion mode, according to embodiments.

FIG. 2 is a diagram illustrating an example transformation of a vehicle (e.g., vehicle 100) from a retracted rolling motion mode to an extended rolling motion mode, according to embodiments. As illustrated, in position 210 (top panel of FIG. 2, left) the wheel-leg components of the vehicle are retracted, providing a rolling locomotion mode for use on roads or other flat surfaces. In position 220 (top panel of FIG. 2, right), the wheel-leg components of the vehicle are slightly or partly extended, allowing for rolling locomotion as well as some walking locomotion. In position 230 (vehicle at bottom of FIG. 2), the wheel-leg components of the vehicle are fully extended, allowing for rolling locomotion and walking locomotion. As depicted in FIG. 2 wheel-leg components 111 suitably include leg units 112 and 118 that mates with knee unit 116 that provides a degree of freedom. Upper leg unit 112 mates with hip unit 114 that can provide a further degree of freedom. Lower leg unit 118 mates with an ankle unit that communicates with wheel 120.

Figure 3:
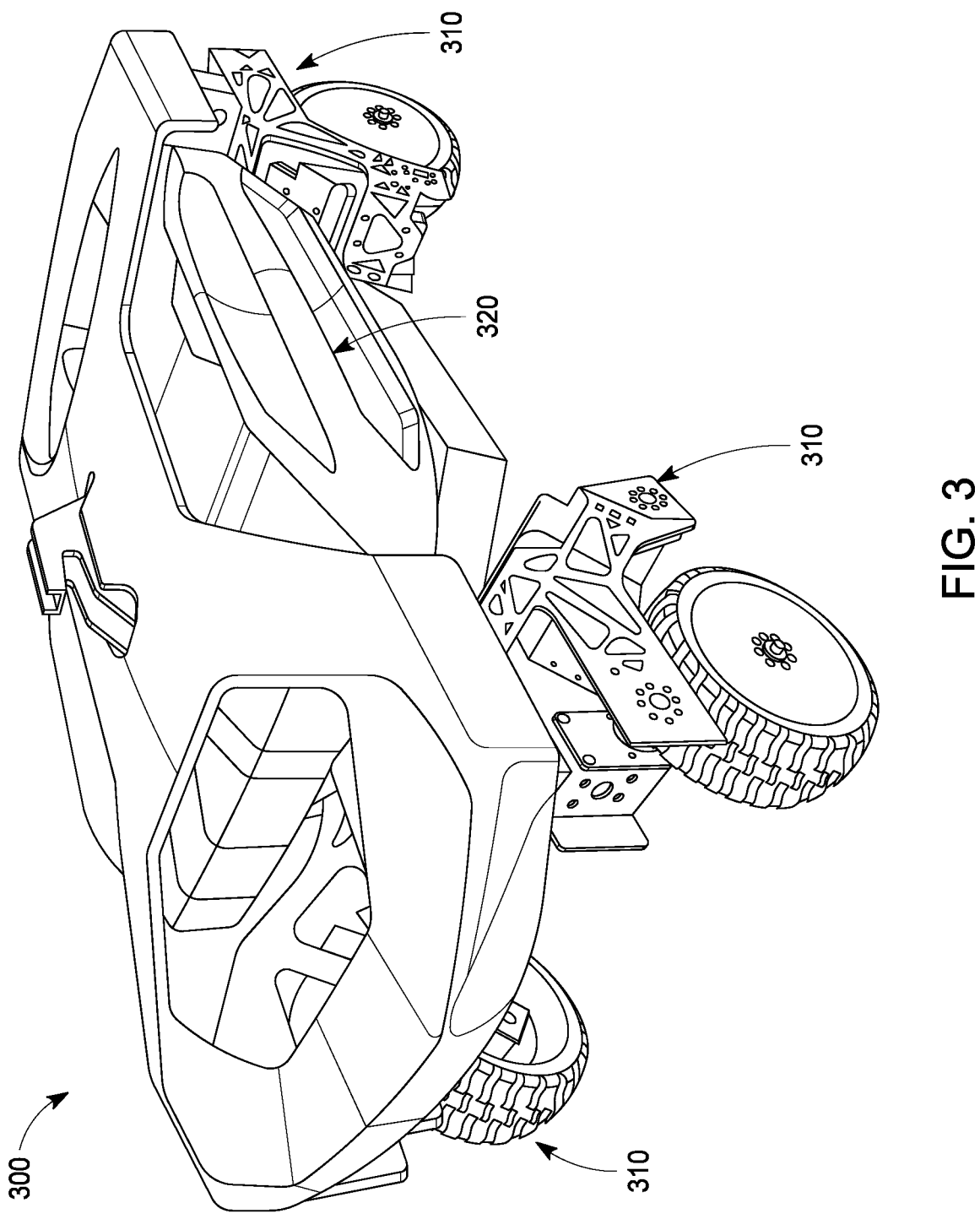
FIG. 3 is a diagram illustrating an example unmanned vehicle capable of locomotion using both walking motion and rolling motion, according to embodiments.

FIG. 3 is a diagram illustrating an example unmanned vehicle 300 capable of locomotion using both walking motion and rolling motion, according to embodiments. Vehicle 300 includes four wheel-leg components 310, where wheel-leg components 110 include at least two degrees of freedom. In one embodiment, wheel-leg components 310 include six degrees of freedom (e.g., as illustrated below in FIGS. 8A through 8G). It should be appreciated that the locomotion available to unmanned vehicle 300 is similar to that of vehicle 100 of FIG. 1, as described above. Vehicle 300, in accordance with some embodiments, include cargo pod 320 for storing cargo. Vehicle 300 is configured to receive and transport cargo pod 320.

FIGS. 4A through 4D are diagrams illustrating another example transformation of a vehicle 400 from a rolling motion mode to a walking motion mode, according to embodiments. Vehicle 400 includes four wheel-leg components 410, where wheel-leg components 410 include at least two degrees of freedom. As illustrated, vehicle 400 includes a passenger compartment capable of holding people. It should be appreciated that vehicle 400, in some embodiments, may not include a passenger compartment. For instance, vehicle 400 can be of a size that is too small for holding passengers, and/or may be configured for cargo transport or terrain exploration under unmanned control.

In one embodiment, as with vehicles 100 and 300, wheel-leg components 410 include six degrees of freedom (e.g., as illustrated below in FIGS. 8A through 8G). It should be appreciated that while wheel-leg components 410 are controlled collectively to provide rolling and walking locomotion, each wheel-leg component 110 is capable of different movement or positioning during operation. For example, while using wheeled locomotion on an upward slope, in order to maintain the body of vehicle 400 level with flat ground, the front wheel-leg components 410 may be retracted and the rear wheel-leg components 110 be extended. In another example, while using walking locomotion to traverse rough terrain, each wheel-leg component 410, or opposite pairs of wheel-leg components 410 (e.g., front left and rear right), can move differently than the other wheel-leg components 410.

Figure 4A:
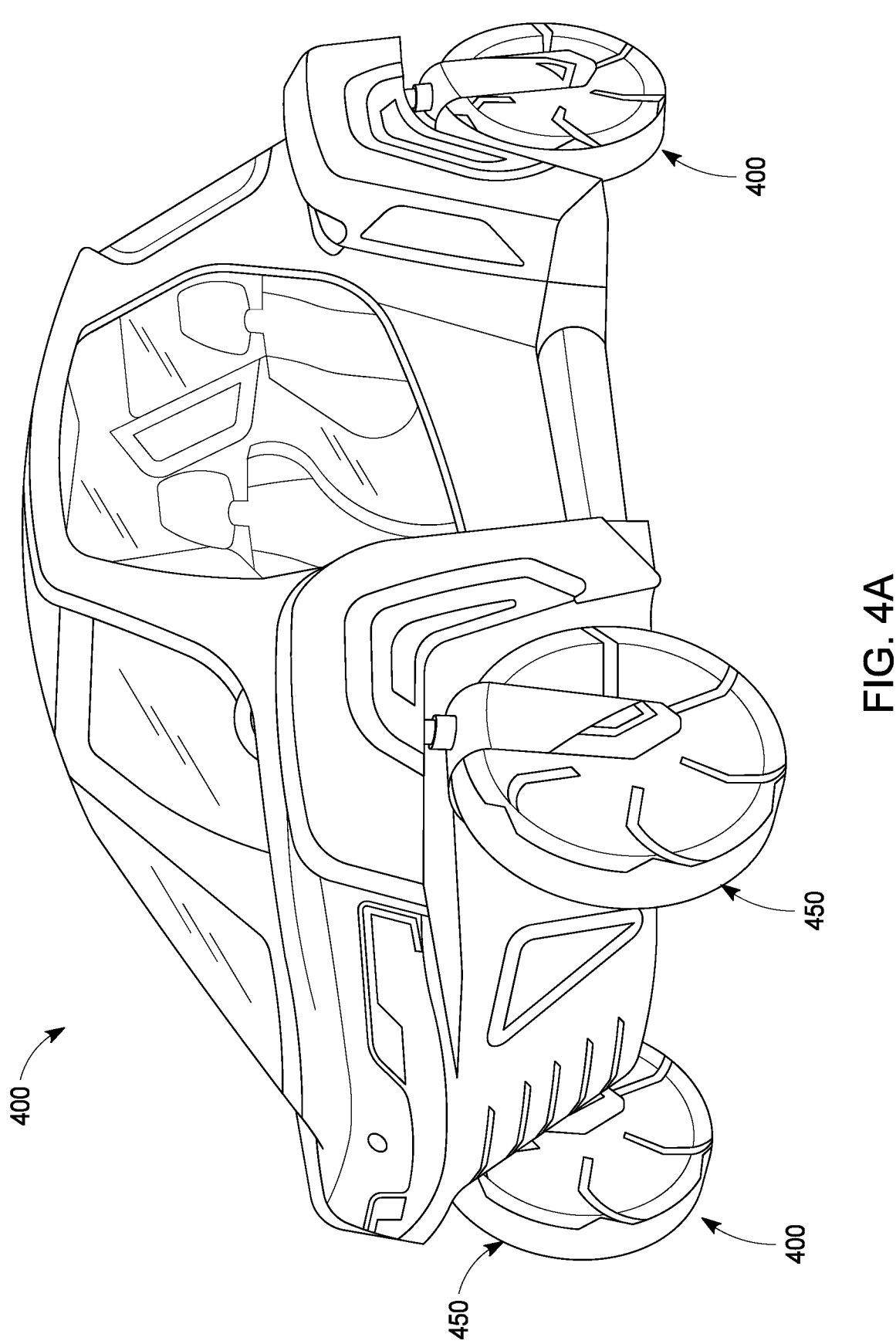
FIGS. 4A through 4D illustrate 1) transformation of a vehicle from a rolling motion mode to a walking motion mode and 2) preferred vehicles.
Figure 4B:
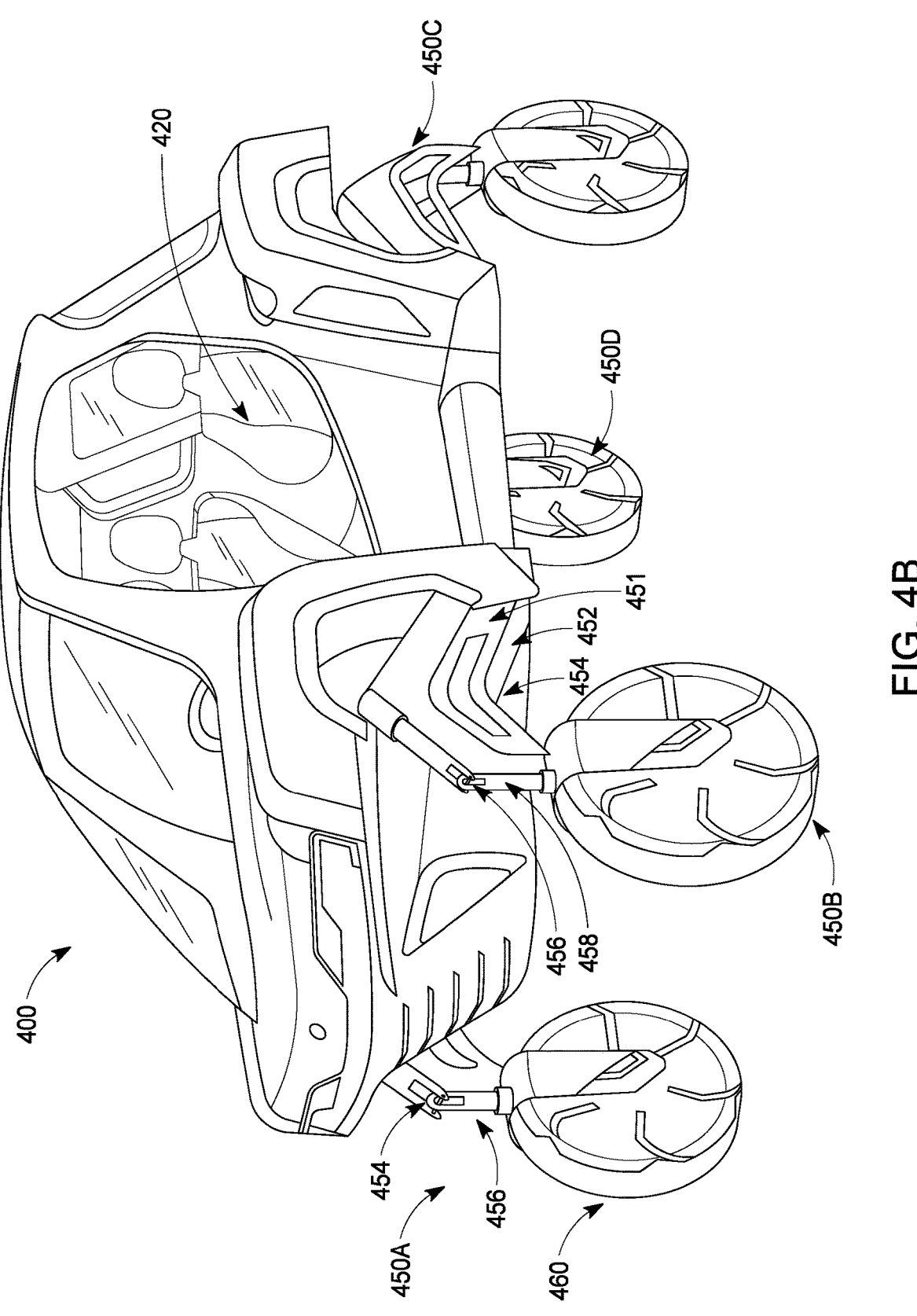
Figure 4C:
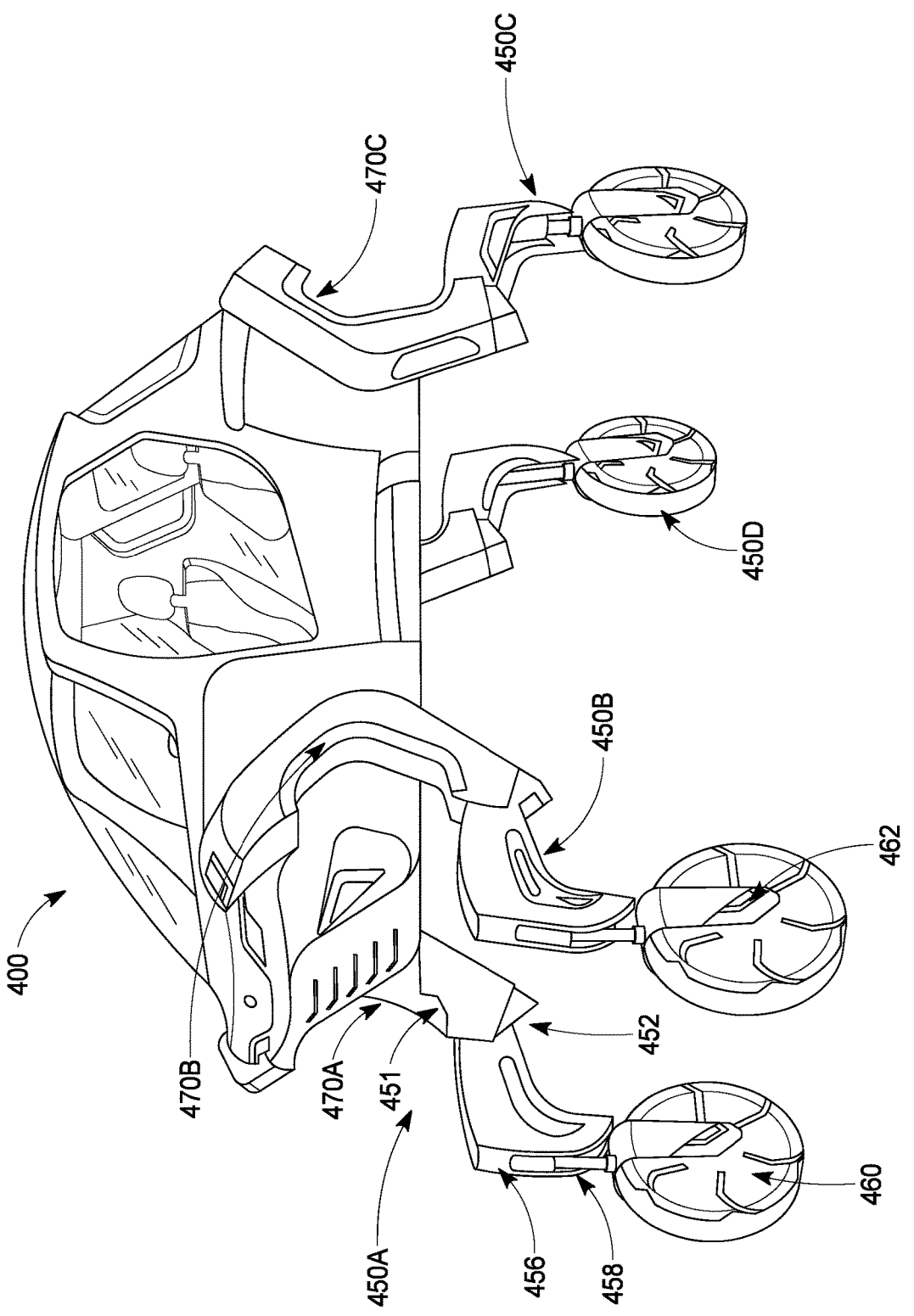
Figure 4D:
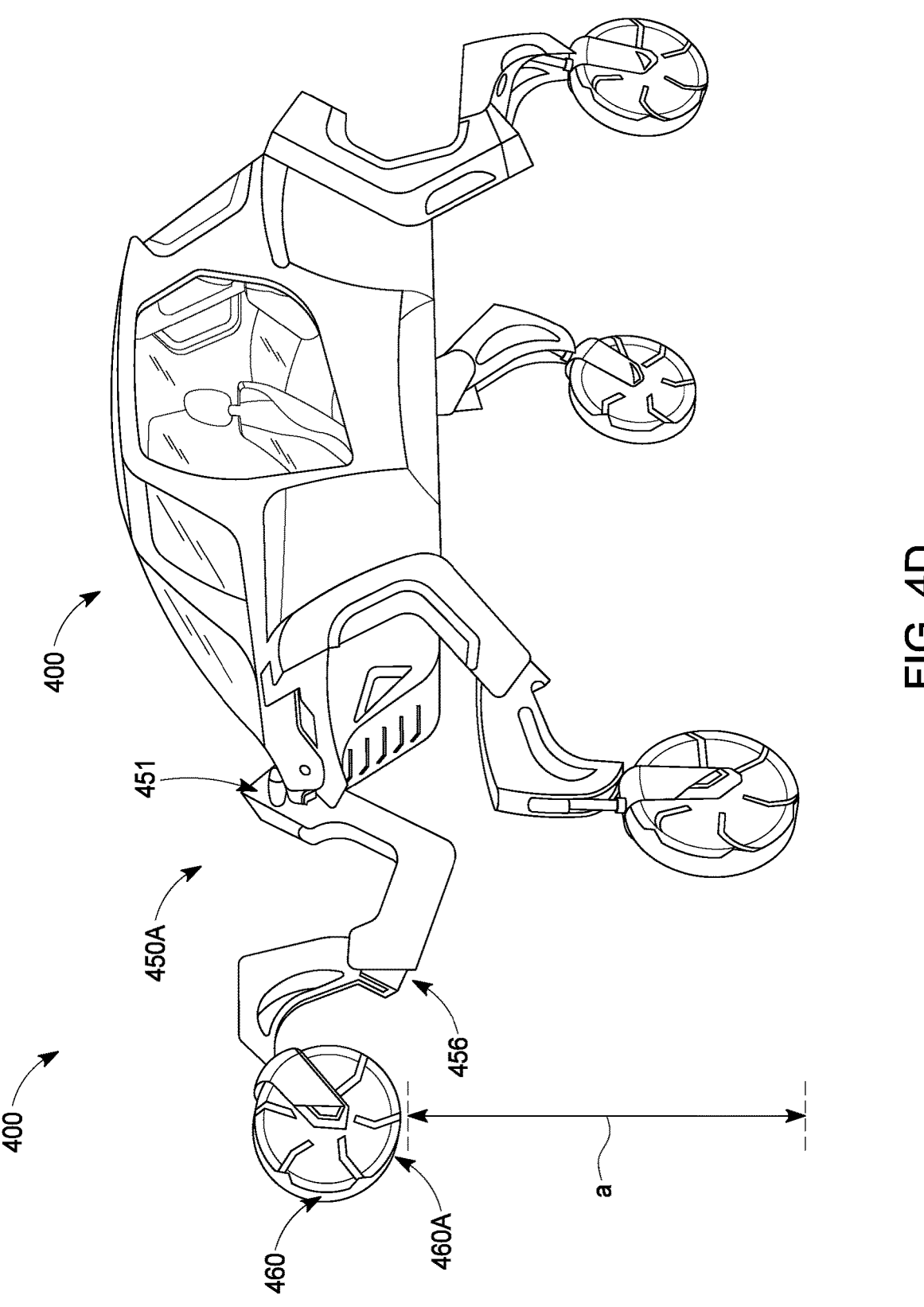

As illustrated, in FIG. 4A, the wheel-leg components 450 of the vehicle 400 are retracted, providing a rolling locomotion mode for use on roads or other flat surfaces. In FIG. 4B, the wheel-leg components 450 (which include the depicted components 450A, 450B, 450C and 450D) of the vehicle 400 are slightly or partly extended, allowing for rolling locomotion as well as some walking locomotion. In FIG. 4C, the wheel-leg components 450 (which include the depicted components 450A, 450B, 450C and 450D) of the vehicle 400 are fully extended, allowing for rolling locomotion and walking locomotion. In FIG. 4D, one of the wheel-leg components 450A is upwardly extended a distance a from the ground plane, illustrating the walking locomotion of vehicle 400. Distance a shown in FIG. 4D (shown as wheel 460 bottom surface 460A to the shortest distance to the ground plane) may vary widely shown such as up 0.5, 1, 2, 3, 6, 9, 12 inches or more, or up to 1, 2, 3, 4, 5, 6, 7, 8, 9, 10, 12, 12 feet or more. FIGS. 4A through 4D depict passenger cabin 420 and portions of the preferred depicted wheel-leg components including leg units 454 and 458 that mate with knee unit 456. Hip component 452 mates with hip unit 451. Each of the wheel-leg components 450A, 450B, 450C and 450D can nest within respective nesting areas 470A, 470B, 470C and 470D when the wheel leg components are in retracted position as shown in FIG. 4A.

Figure 4F:
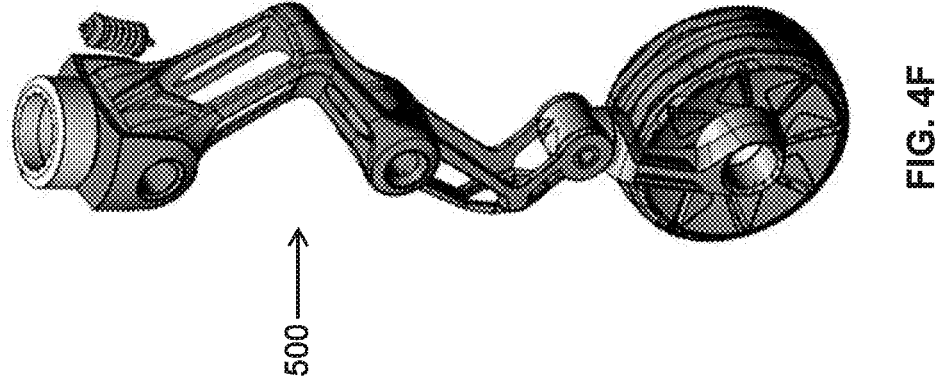
FIGS. 4E and 4F are diagrams illustrating a wheel-leg component in retracted and extended positions respectively, according to embodiments.
Figure 4E:
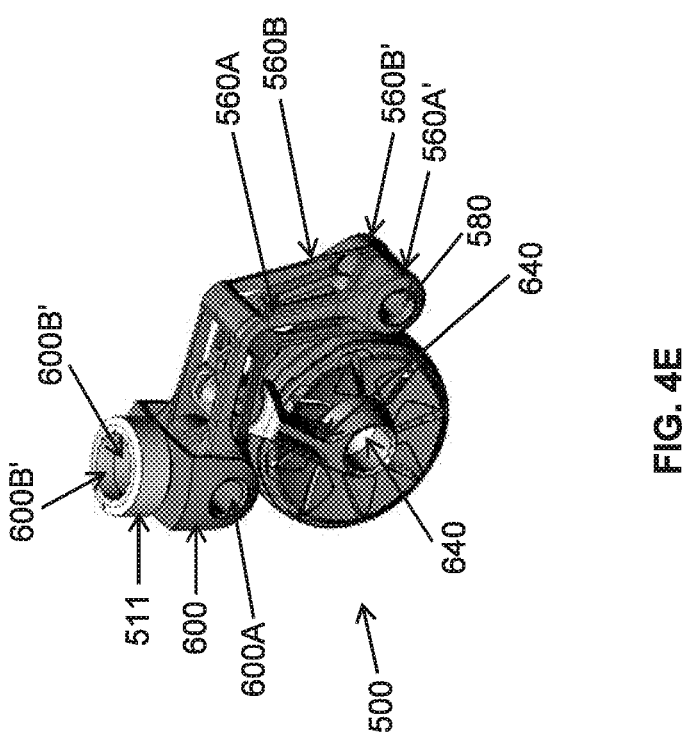

FIGS. 4E and 4F are diagrams illustrating an example wheel-leg component in retracted and extended positions, according to embodiments. Various embodiments of such wheel-leg components are described in U.S. Patent Application Publication No. 2020/0216127. With reference to FIG. 4E, the wheel-leg component is in a retracted state, with the wheel-leg component capable of providing wheeled locomotion. FIG. 4E shows leg portions 560A and 560B with respective first ends 560A' and 560B' that mate or connect (e.g., hinged or other fastening mechanism) to provide knee joint unit 580 and a degree of freedom. A second end of the first leg portion 560A mates with or otherwise connects to hip portion 600 that includes a hip joint unit and a further degree of freedom. The dimensions of leg portions 560A and 560B suitably can vary widely and may or may not be the same. Thus, the length of leg portion 560A (shortest line as extending between 560A' and hip portion 600) and the length of leg portion 560B (shortest line as extending between 560B' and hip portion 600) each independently suitably may be up to or at least 0.2, 0.5, 0.8, 1.0, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, or 5.0 meters. The hip portion 600 includes extension portion 600A and can be coupled to a vehicle chassis via a hip abduction portion 511 that includes mating unit 600B'. The depicted wheel unit includes wheel shaft 640. A wheel joint unit and wheel shaft 640 may form a wheel steering and rotation housing as also disclosed in US2020/0216127.

Figure 5:
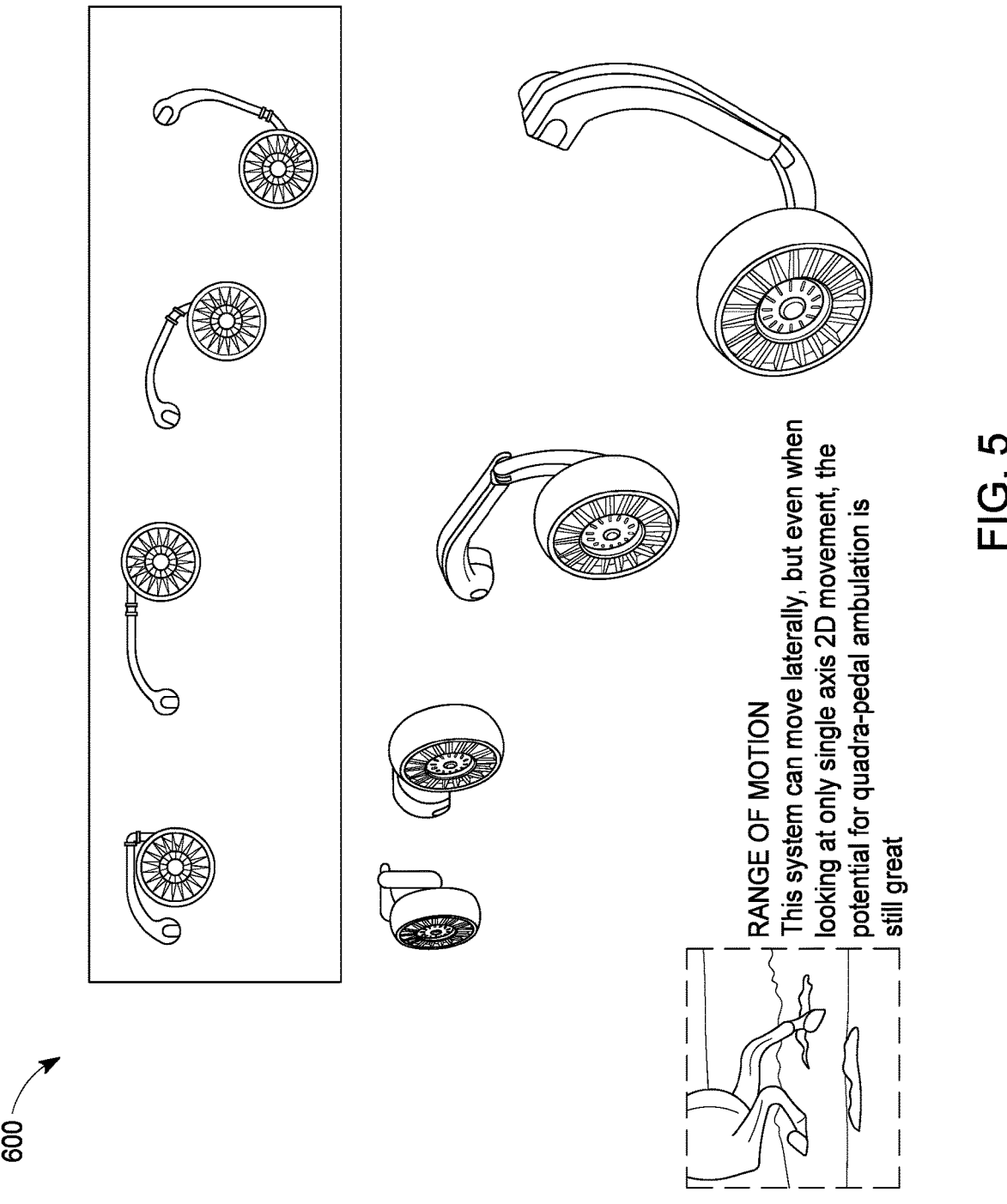

With reference to FIG. 4F, the wheel-leg component 500 is in an extended state, with the wheel-leg component capable of providing walking locomotion. A FIG. 5 is not depicted herein.

In accordance with the described embodiments, wheeled locomotion is available for use in situations where traditional vehicle travel using rolling wheels is available (e.g., roads and highways). Wheeled locomotion is efficient, when available, for conveyance of a vehicle between destinations. In some embodiments, the wheel-leg components allow active height adjustment of the vehicle to go from street use to off-road use.

In walking locomotion, the vehicle is able to walk up elevations and terrain that is not surmountable using wheeled locomotion. In some instances, walking locomotion allows for nimble and quiet motion, relative to wheeled locomotion. The vehicle is also capable of moving laterally, allowing for quadra-pedal ambulation.

In some embodiments, the use of in-wheel motors frees the suspension from traditional axels and allows ambulation, but also increases the driving performance and adaptability. By using the wheels as feet, the electric motors can lock for stable ambulation, but also have slow torque controlled rotation for micro movements when climbing or self-recovery. In some embodiments, the wheel of the wheel-leg component has the ability to rotate 180 degrees perpendicular to the hub, not only allowing leaning capability while driving, but also giving the wheels enhanced positioning potential when the tire is locked and in walking mode. The wheel could turn 90 degrees and even be used as a wide foot pad lowering the vehicle's PSI footprint when walking over loose materials or fragile surfaces like a snowshoe does.

Figure 6:
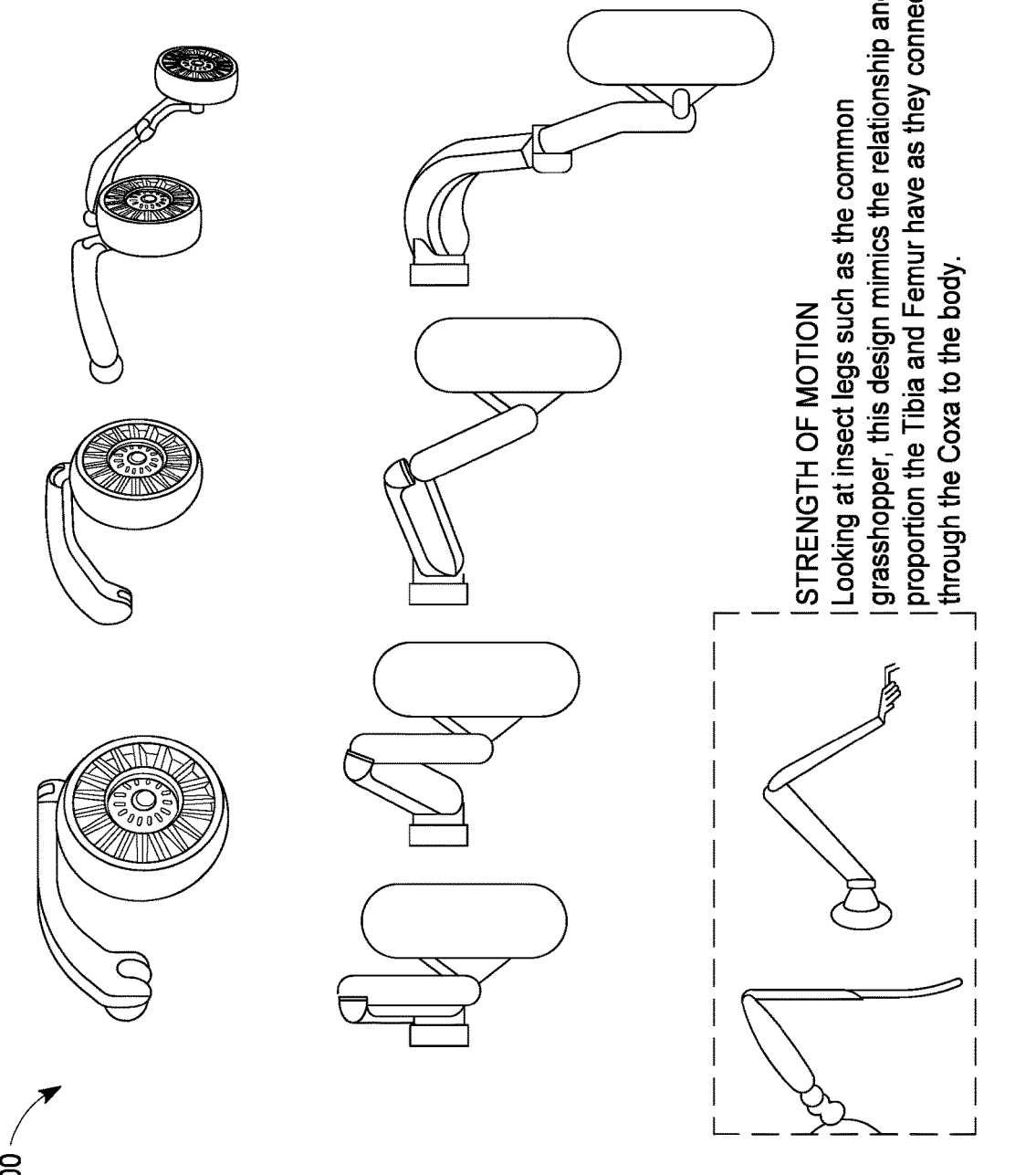
FIG. 6 is a diagram of the extension of a wheel-leg component into a mammalian position, in accordance with an embodiment.
Figure 7A:
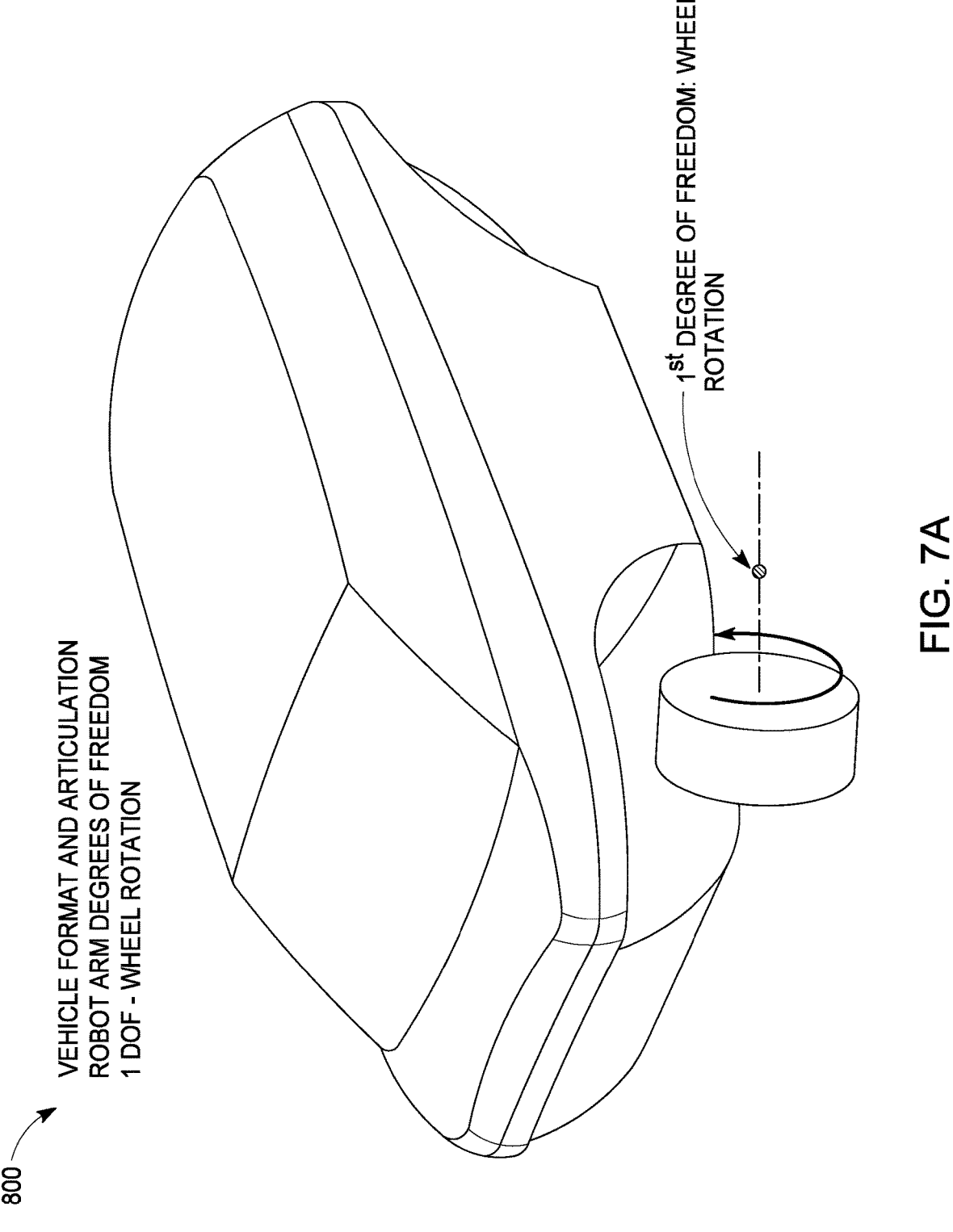
FIG. 7 is a diagram of the extension of a wheel-leg component into a reptilian position, in accordance with an embodiment.
Figure 7C:
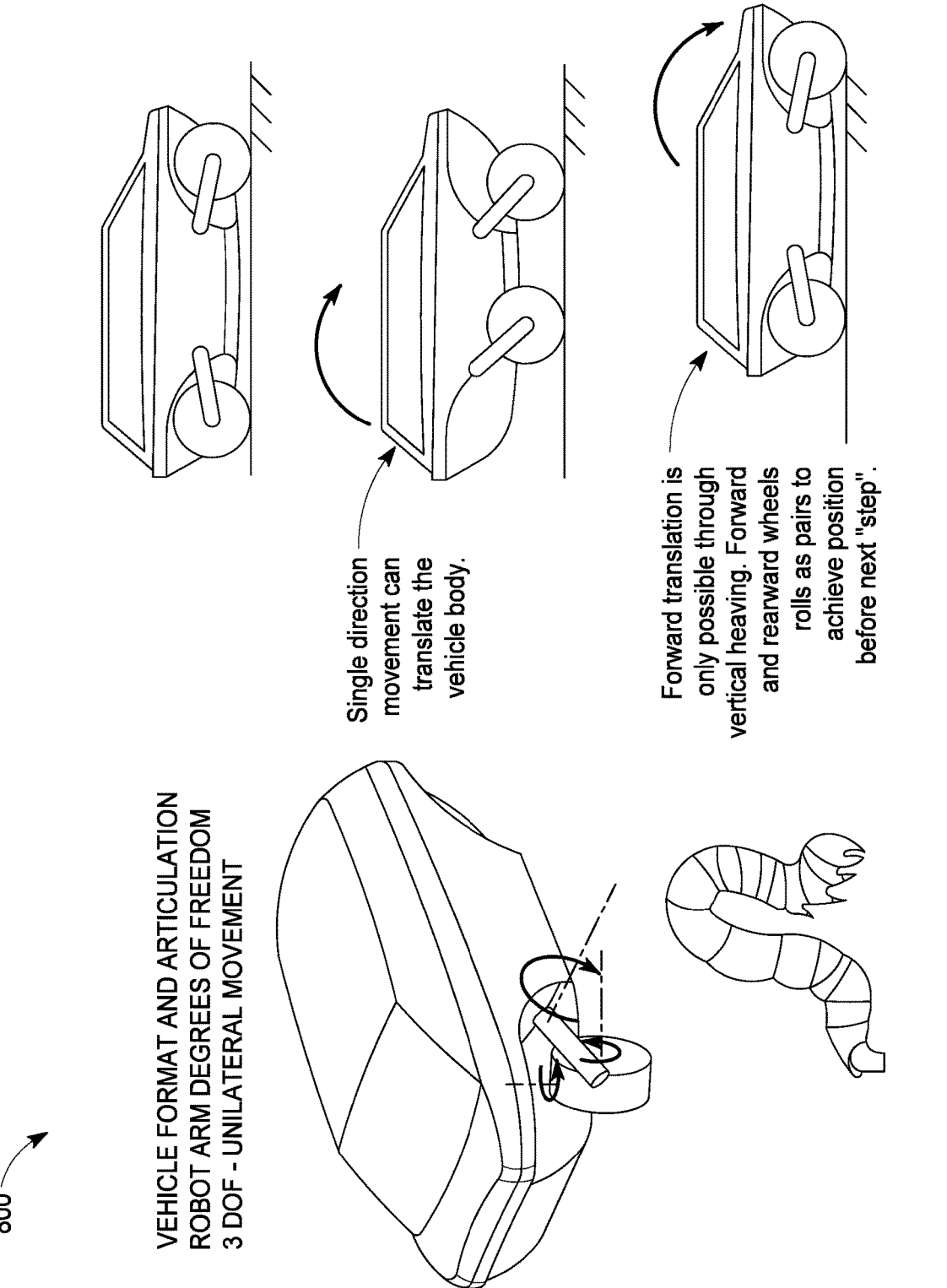
Figure 7D:
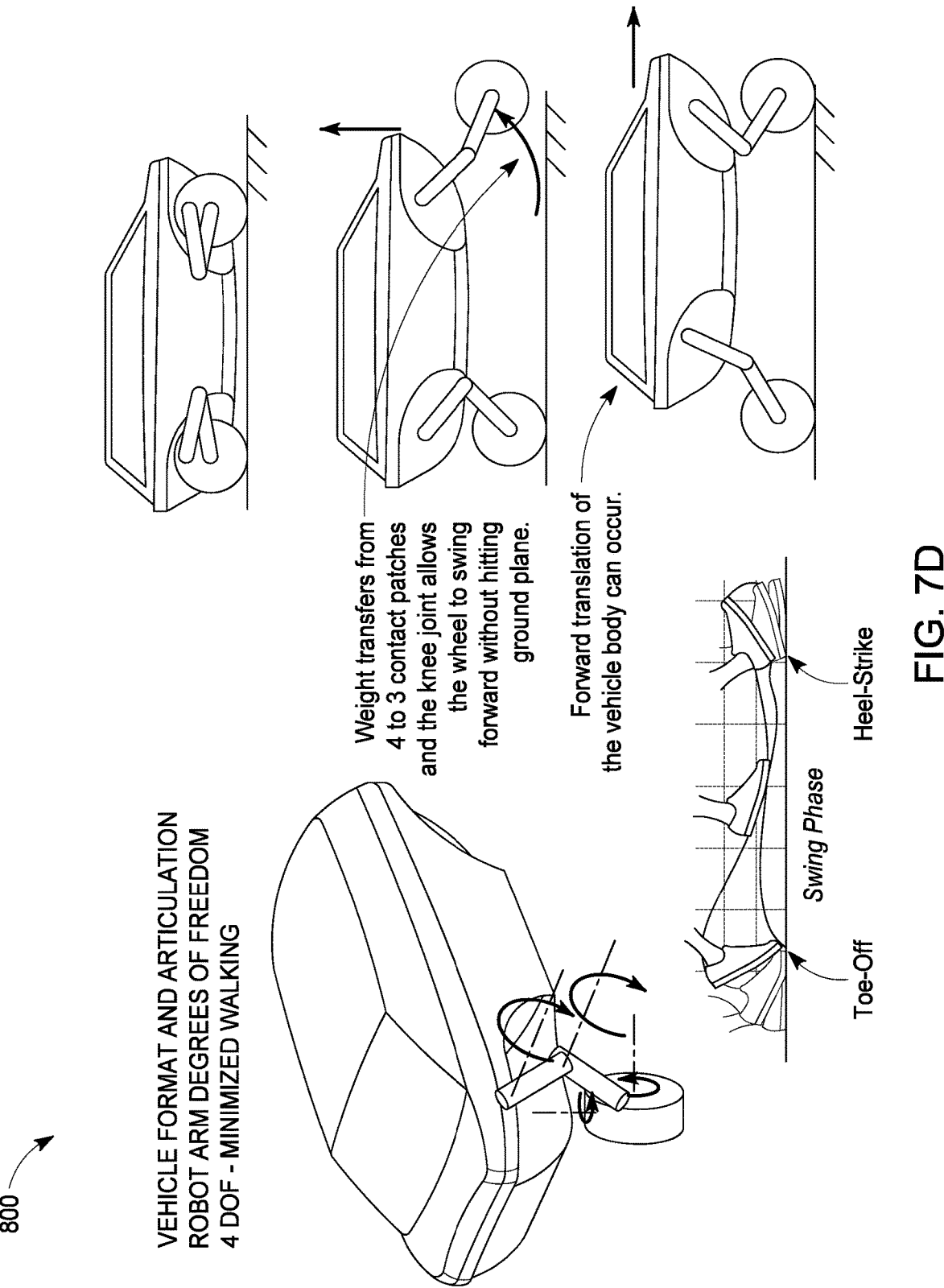
Figure 7E:
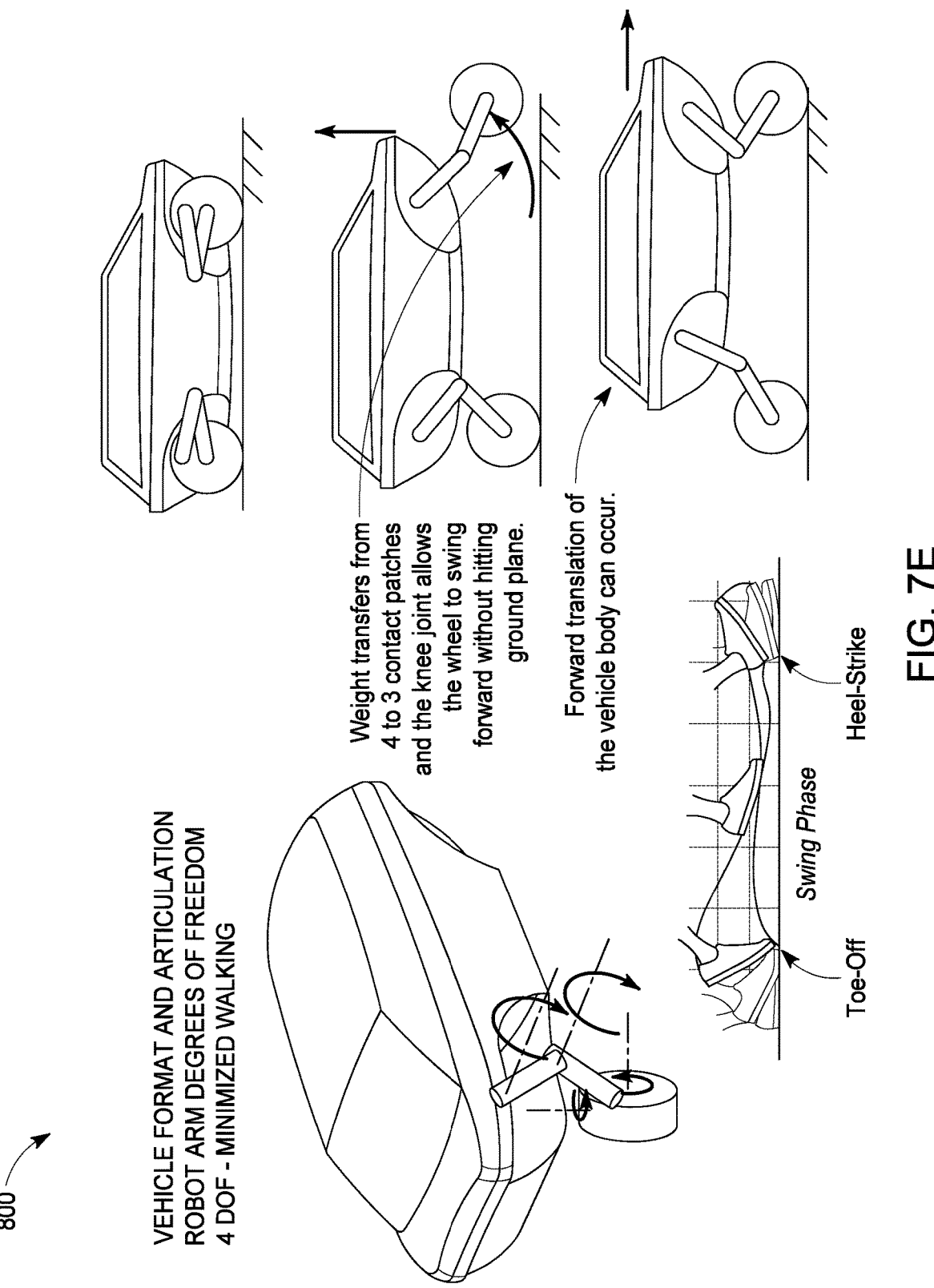

FIG. 6 is a diagram of the extension of a wheel-leg component into a mammalian position, in accordance with an embodiment. In the mammalian position, the wheel-leg component extends outwards in the direction of travel of the vehicle.

Figure 7B:
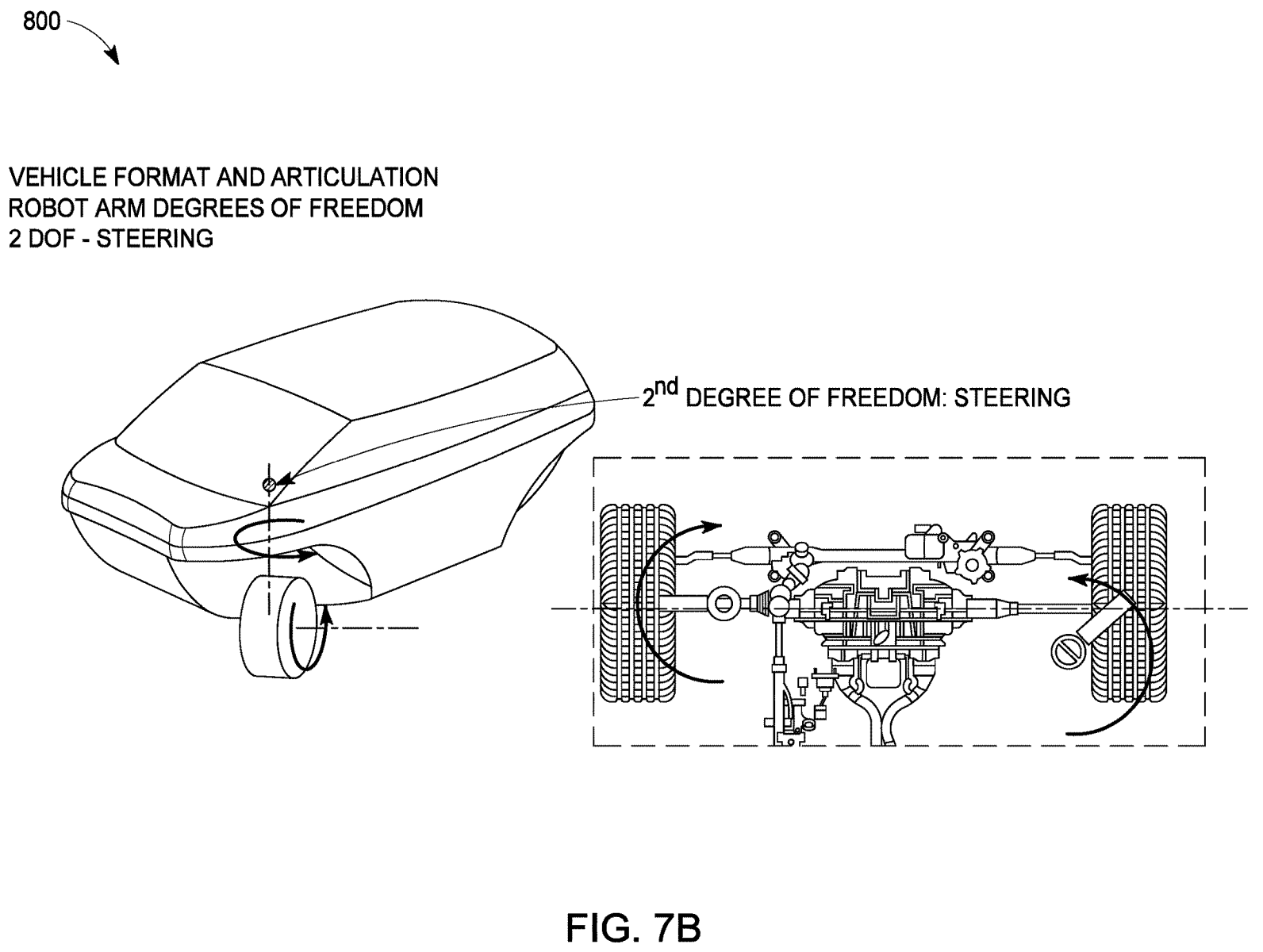

FIG. 7 is a diagram of the extension of a wheel-leg component into an insect-like position, in accordance with an embodiment. In the insect-like position, the wheel-leg component extends outwards perpendicular to the direction of travel of the vehicle.

Vehicle Format and Articulation Robot Arm Degrees of Freedom

Different types of locomotion providing different paths of motion, e.g., degrees of freedom, may require or utilize different numbers and configurations of members and joints. Embodiments herein utilize wheel-leg components that transform into different positions for providing a desired degrees of freedom of locomotion. FIGS. 8A through 8H illustrate examples of vehicle articulation in different degrees-of-freedom, according to embodiments.

1 Degree of Freedom—Wheel Rotation

Figure 8A:
Figure 8A:
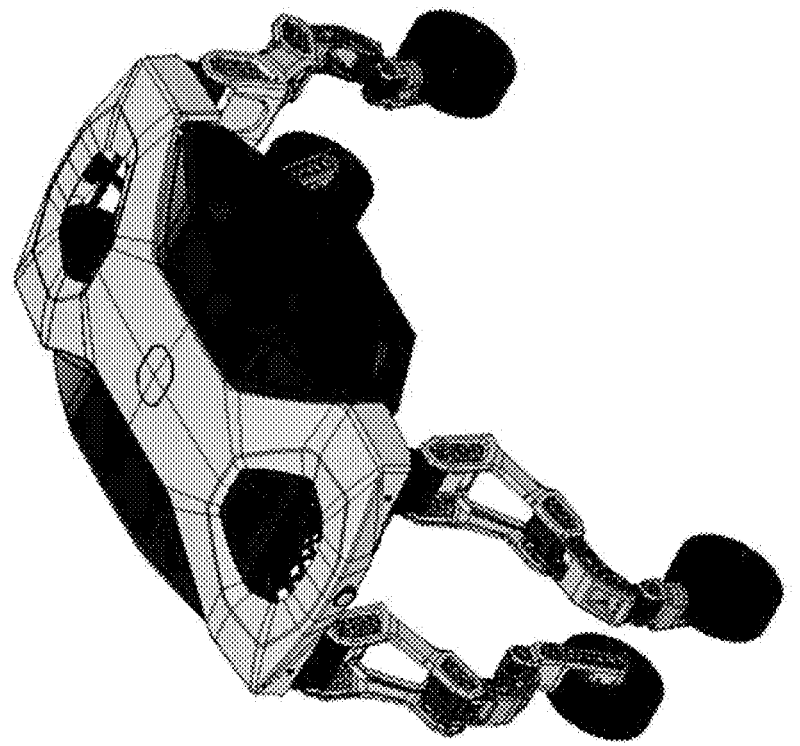

FIG. 8A illustrates and example vehicle movement using a wheel-leg component utilizing one degree of freedom, according to an embodiment. Wheel rotation movement refers to the rotation of the wheel located at one end of the wheel-leg component. Movement here is located at the end of the robotic arm. According to some embodiment, the robotic arm movement itself should be as unrestricted as possible. As such, the wheel rotation motion should be achieved as locally as possible to the wheel hub center.

2 Degrees of Freedom—Steering

Figure 8B:
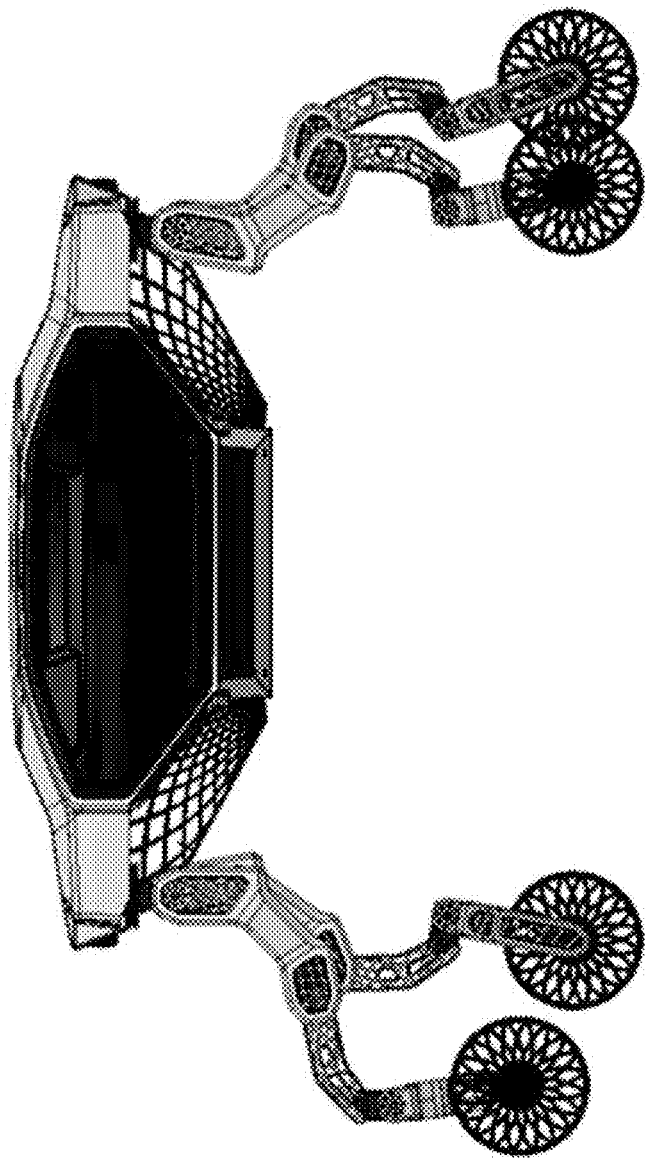

FIG. 8B illustrates and example vehicle movement using a wheel-leg component utilizing two degrees of freedom, according to an embodiment. Steering refers to directional control of the wheel. For example, from a top view, as illustrated in FIG. 8B, the steering axis should be located on the wheel centerline to avoid wheel scrub (skidding of the wheel during turning). It should be appreciated that the angles and orientation of this axis play roles in vehicle dynamics.

3 Degrees of Freedom—Unilateral Movement

Figure 8C:
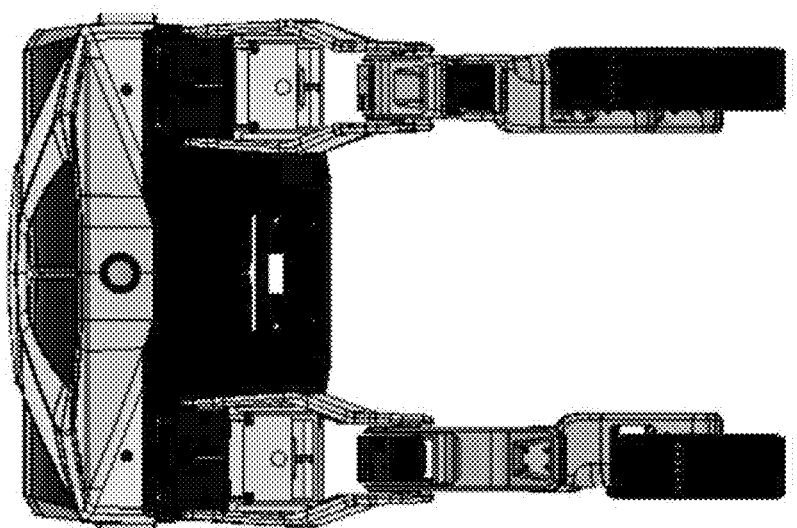
Figure 8C:

FIG. 8C illustrates and example vehicle movement using a wheel-leg component utilizing three degrees of freedom, according to an embodiment. Unilateral motion refers to translation of the vehicle body in a single direction. The single direction movement can translate the vehicle body. Forward translation is only possible through vertical heaving. Forward and rearward wheels roll as pairs to achieve position before next "step". As illustrated in FIG. 8C, the forward wheel and rearward wheels both face towards the front of the vehicle, which is the direction of movement. The rearward wheel-leg component propels the vehicle in the direction of movement, while the forward wheels rotate freely, allowing the vehicle to move unilaterally forward.

4 Degrees of Freedom—Minimized Walking

Figure 8D:
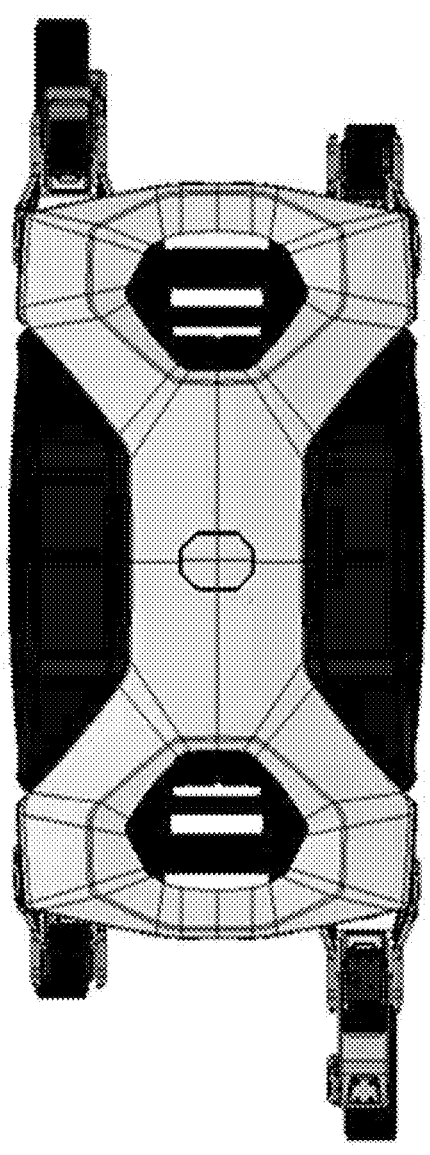
Figure 8D:

FIG. 8D illustrates and example vehicle movement using a wheel-leg component utilizing four degrees of freedom, according to an embodiment. Minimized walking refers to the forward translation of the vehicle body using middle joints (e.g., knee joints) of the vehicle without the vehicle contacting the ground. Weight transfers from four to three contact patches and the knee joint allows the wheel to swing forward without hitting ground plane. Forward translation of the vehicle body can occur.

5 Degrees of Freedom—Stability+Centroid Control

FIG. 8E illustrates and example vehicle movement using a wheel-leg component utilizing five degrees of freedom, according to an embodiment. Stability and centroid control movement allows for lateral movement of the vehicle body. For example, outward articulation widens the vehicle stance and provides tipping stability. Through varying armature positions, the vehicle can bank and roll, allowing it to shift the lateral center of gravity location with respect to its ground contact patch.

5 Degrees of Freedom—Stability+Centroid Control—Reptilian Vs MAMMALIAN

FIG. 8F illustrates and example vehicle movement using a wheel-leg component utilizing five degrees of freedom in a reptilian locomotion mode and a mammalian locomotion mode, according to an embodiment. Providing wheel-leg components including five degrees of freedom allows for different permutations of the wheel-leg components while extended. In one embodiment, the vehicle can operate in a reptilian locomotion mode, e.g., using a reptilian walking gait. In reptilian waling mode, forward articulation first swings the legs outward (e.g., away from each other). This locomotion position provides lateral stability by widening the contact points between the wheel-leg components and the vehicle. Reptilian walking mode may hinder mobility in tight environments (in alleyways, through narrow trails, etc.) due to the widening of the stance.

In other embodiments, the vehicle can operate in a mammalian locomotion mode, e.g., using a mammalian walking gait. In mammalian walking mode, forward articulation requires a height gain first. This locomotion position provides increased ground clearance and allows mobility without violating the vehicle lane. Vertical real estate is likely much easier to come by than lateral. Lateral stability can still be achieved and increases as the vehicle lowers, requiring smaller steps.

6 Degrees of Freedom—Dedicated Steering Axis—360 Degree Steering Control

FIG. 8G illustrates and example vehicle movement using a wheel-leg component utilizing six degrees of freedom, according to an embodiment. As illustrated, the steering axis is lifted above the wheel for 360 degree rotation capability. This also provides additional height gain and arm clearance over tall obstacles during forward reach.

As illustrated, in position 872, where the wheel-leg components are retracted, the steering axis is perpendicular to ground plane. In position 874, where the wheel-leg components are extended, the steering axis almost parallel to ground plane. The steering efficiency of position 874 is reduced relative to position 872. The added degree of freedom of the steering control maintains an effective steering axis, as illustrated in position 876.

7 Degrees of Freedom—Wheel Vertical Angle

FIG. 8H illustrates and example vehicle movement using a wheel-leg component utilizing seven degrees of freedom, according to an embodiment. The seventh degree of freedom allows for rotation of the wheel such that the side of the wheel can be in contact with the ground, providing a firm basis for support. Since an additional joint controls the wheel vertical angle, a standard automotive wheel can be applied. For instance, automotive tires offer a larger contact patch than motorcycle tires. With enough rotation, the vehicle may turn its wheel and walk on the rim face, effectively multiplying the contact patch for snow, mud, etc. In such an embodiment, the vehicle can operate in walking locomotion where the sides of the wheels make contact with the ground.

Figure 9A:
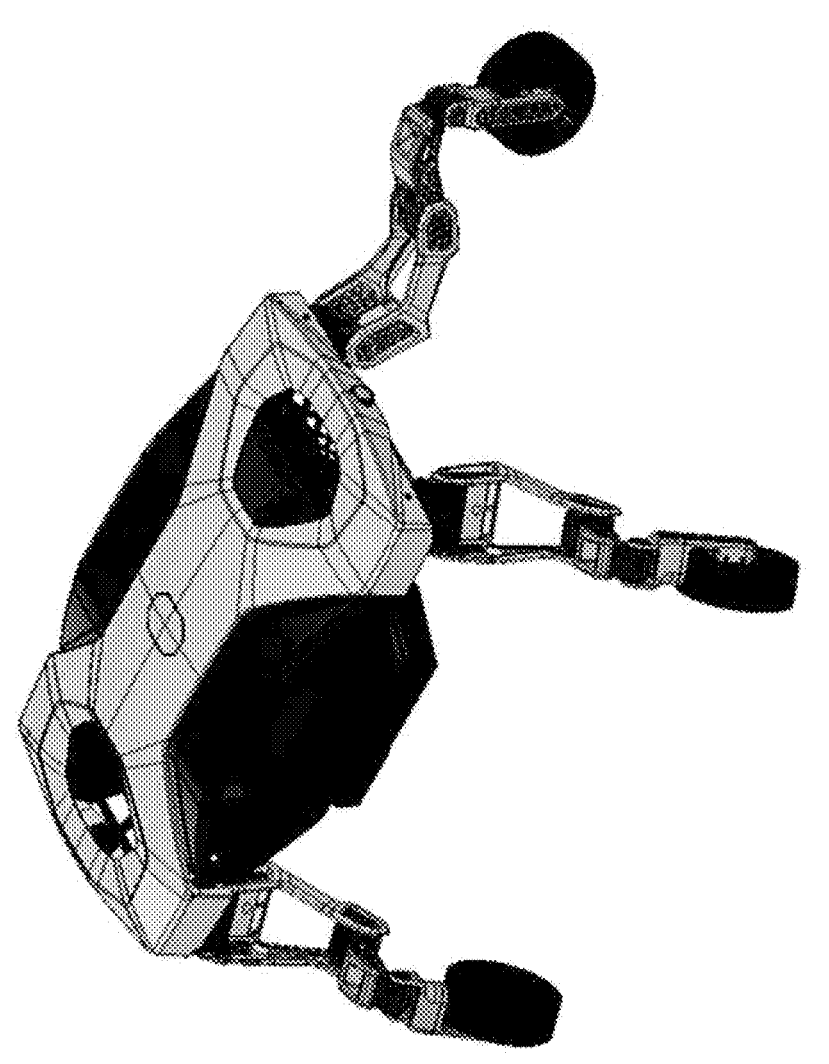
FIGS. 9A through 9D illustrate example views of a vehicle operating in a mammalian walking gait, according to embodiments.
Figure 9A:
Figure 9B:
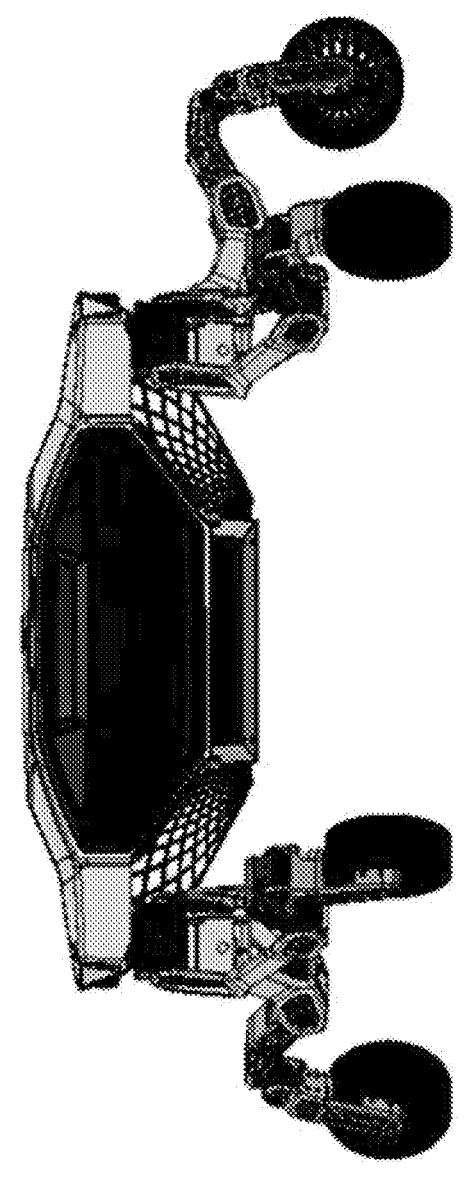
Figure 9C:
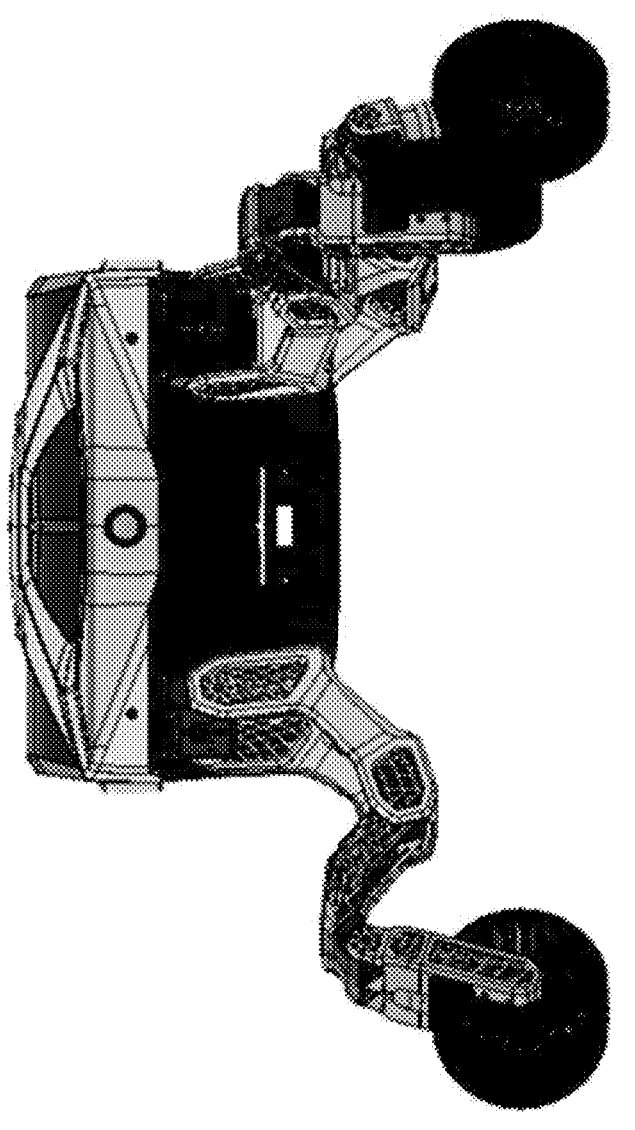
Figure 9D:
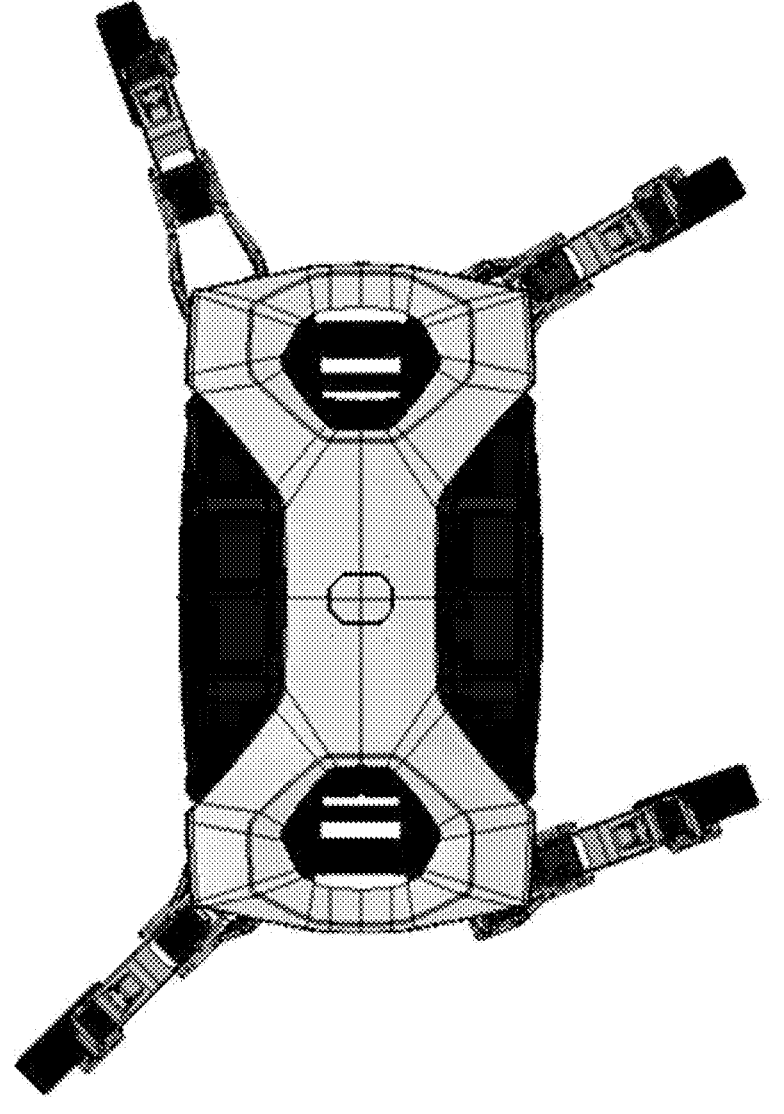

FIGS. 9A through 9D illustrate example views of a vehicle operating in a mammalian walking gait, according to embodiments. FIG. 9A illustrates perspective view 900, FIG. 9B illustrates side view 910, FIG. 9C illustrates front/rear view 920, and FIG. 9D illustrates top view 930. The mammalian walking gait positions the legs and support position below the hips, allowing more of the reaction force to translate axially through each link rather than in shear load. In this position each leg is closer to a singularity, meaning that for a given change in a joint angle, the end effector will move relatively little. This results in a relatively energy efficient gait which is well suited for moderate terrain over longer periods of time, but may not be as stable because of the more narrow stance of the vehicle.

Figure 10A:
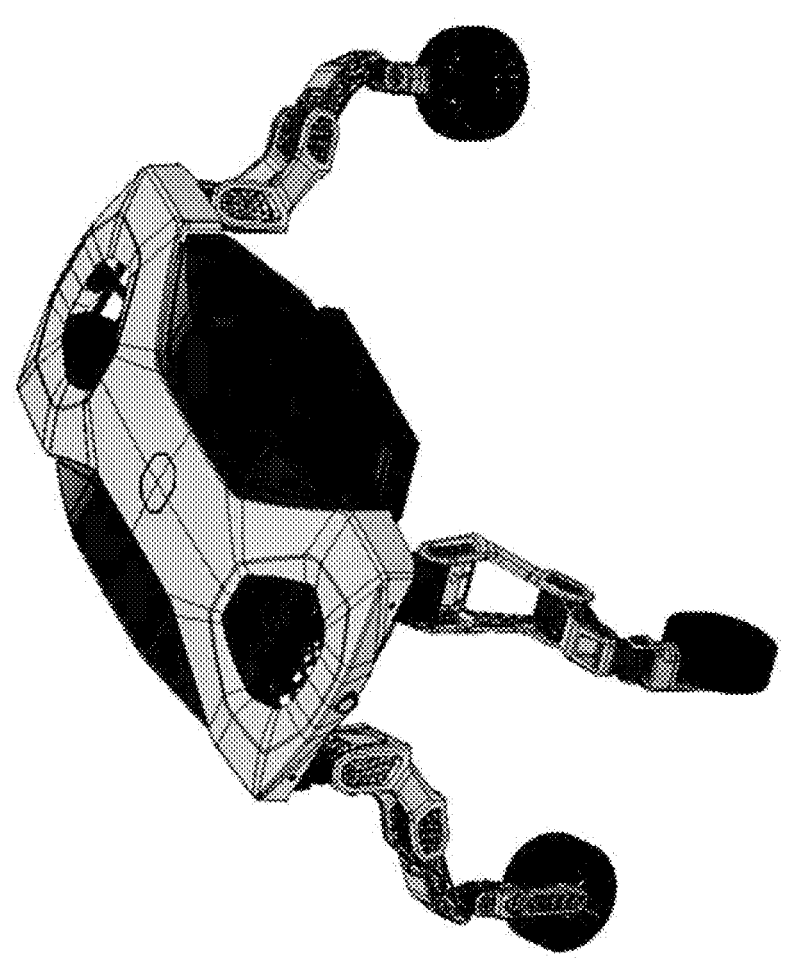
FIGS. 10A through 10D illustrate example views of a vehicle operating in a reptilian walking gait, according to embodiments.
Figure 10B:
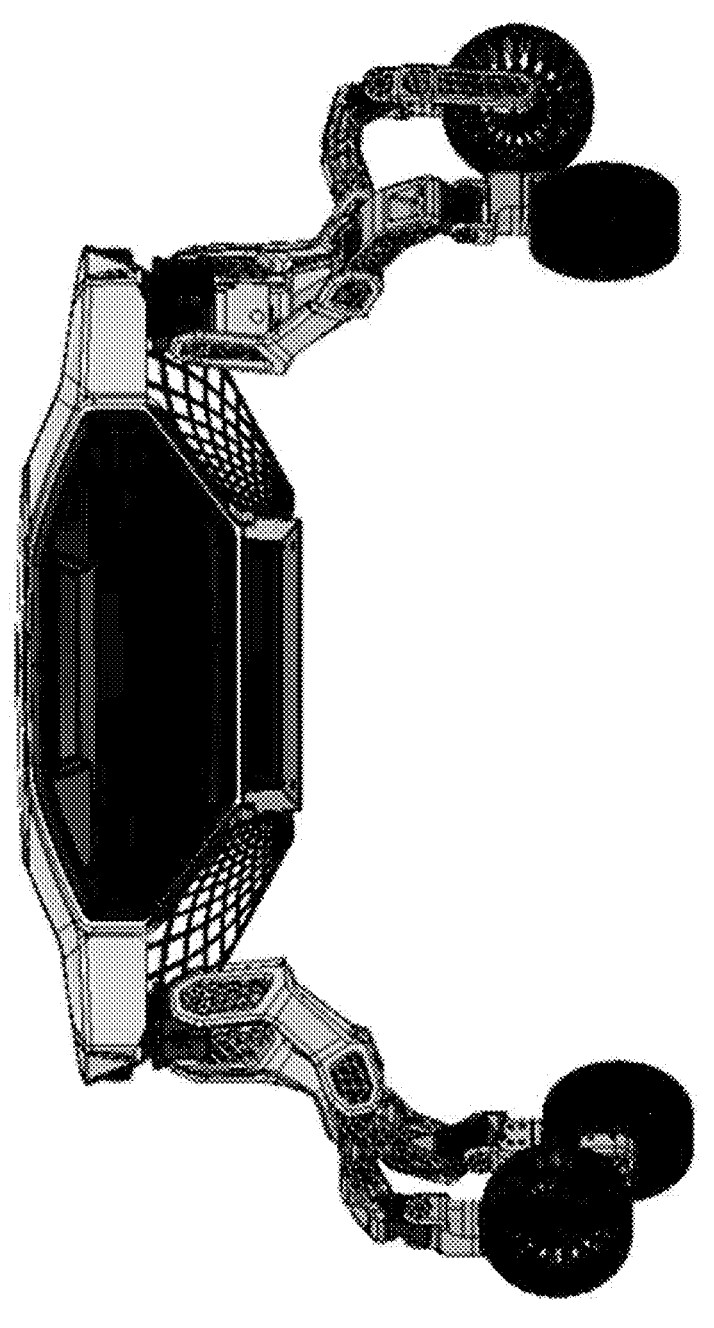
Figure 10B:
Figure 10C:
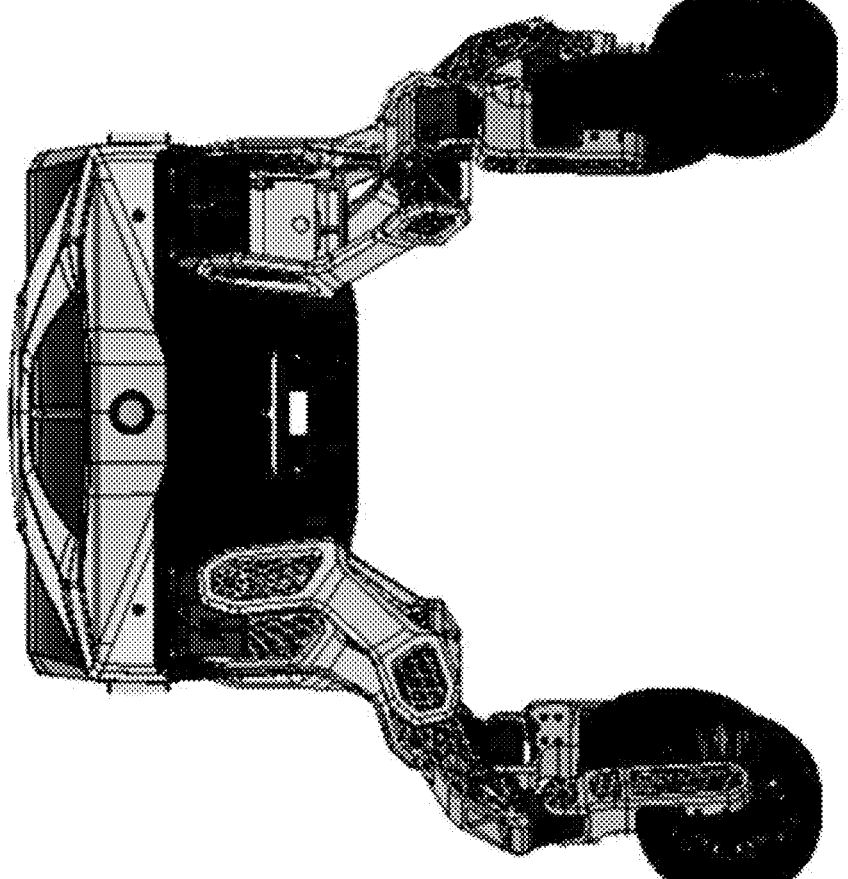
Figure 10D:
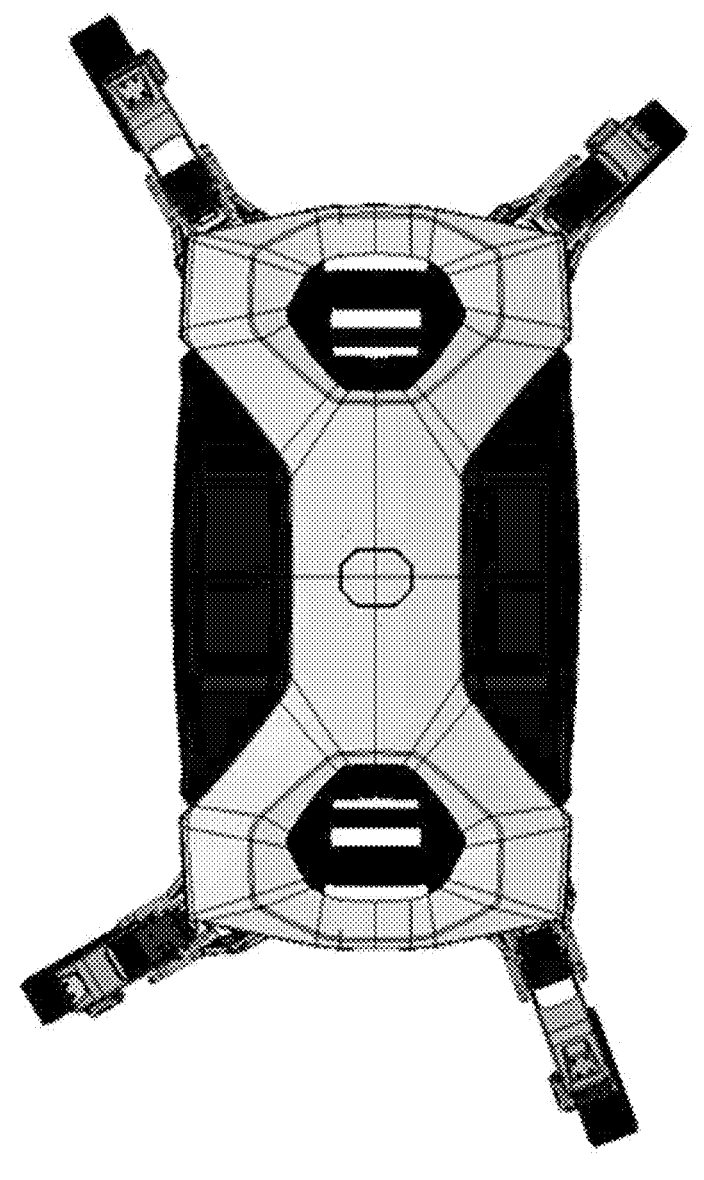
Figure 10D:

FIGS. 10A through 10D illustrate example views of a vehicle operating in a reptilian walking gait, according to embodiments. FIG. 10A illustrates perspective view 1000, FIG. 10B illustrates side view 1010, FIG. 10C illustrates front/rear view 1020, and FIG. 10D illustrates top view 1030. The reptilian walking gait mirrors how animals such as a lizard or gecko might traverse terrain. In this position, the gait relies more heavily on the hip abduction motors which swing the legs around the vertical axis, maintaining a wider stance. This gait position results in a higher level of stability and control over movement, but is less energy efficient. The wide stance results in high static loads on each motor, making the reptilian gait best suited for walking across extremely unpredictable, rugged terrain for short periods of time.

FIGS. 11A through 11D illustrate example views of a vehicle operating in a hybrid walking gait, according to embodiments. FIG. 11A illustrates perspective view 1100, FIG. 11B illustrates side view 1110, FIG. 11C illustrates front/rear view 1120, and FIG. 11D illustrates top view 1130. In addition to reptilian and mammalian gaits, a variety of variants combining the strategies are possible. These variants can be generated through optimization techniques or discovered through simulation and machine learning. These hybrid gaits allow to optimize around the strengths and weaknesses of the more static bio-inspired gaits, transitioning to a more mammalian-style gait when terrain is gentler and a reptilian-style gait in extremely rugged or dynamic environments. In dynamic and highly variable terrains, the vehicle could constantly adjust its gait based on the environment, battery charge, and any number of other factors.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A vehicle comprising:
a plurality of wheel-leg components,
wherein the plurality of wheel-leg components provide wheeled locomotion and walking locomotion,
wherein each wheel-leg component has multiple degrees of freedom and the total degrees of freedom of the wheel-leg components is at least 6, and
wherein the plurality of wheel-leg components utilize at least one of a mammalian walking gait in which the wheel-leg components extend outwards in a direction of travel of the vehicle or a reptilian walking gait in which the wheel-leg components extend outwards perpendicular to the direction of travel during the walking locomotion.

2. The vehicle of claim 1 further comprising a chassis coupled to the wheel-leg components.

3. The vehicle of claim 1 wherein one or more of the wheel-leg components can be operated and articulated independently of one or more other of the wheel-leg components.

4. The vehicle of claim 1 wherein each of the wheel-leg components can be operated and articulated independently with respect to each of the other wheel-leg components.

5. The vehicle of claim 1 wherein each of the wheel-leg components can be operated and articulated independently and in coordination with one or more of the other wheel-leg components.

6. The vehicle of claim 1 wherein the total degrees of the wheel-leg components is at least 24 or 28.

7. The vehicle of claim 1, wherein the wheel-leg components provide the wheeled locomotion in a retracted position and provide the walking locomotion in an extended position.

8. A method comprising:
(a) providing a vehicle of claim 1, wherein the vehicle comprises passenger space for one or more passengers;
(b) moving the vehicle across an uneven ground surface while maintaining the passenger space substantially even.

9. The method of claim 8 wherein the ground surface comprises an incline of at least 3 degrees.

10. The method of claim 8 wherein the ground surface comprises one or more obstacles.

11. The method of claim 8 wherein the one or more of a plurality of wheel-leg components of the vehicle are operated in a walk mode.

12. The method of claim 8 wherein each of a plurality of wheel-leg components of the vehicle are operated in a walk mode.

\* \* \* \* \*

14